(12) United States Patent
Howard

(10) Patent No.: US 9,744,930 B2
(45) Date of Patent: Aug. 29, 2017

(54) PASSENGER RESTRAINT PROVIDING LATERAL LEG CONTAINMENT IN AN AMUSEMENT PARK RIDE VEHICLE

(71) Applicant: DISNEY ENTERPRISES, INC., Burbank, CA (US)

(72) Inventor: Derek Lee Howard, Pasadena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 53 days.

(21) Appl. No.: 14/825,910

(22) Filed: Aug. 13, 2015

(65) Prior Publication Data

US 2016/0114750 A1    Apr. 28, 2016

Related U.S. Application Data

(63) Continuation-in-part of application No. 14/521,139, filed on Oct. 22, 2014.

(51) Int. Cl.
*A63G 1/00* (2006.01)
*B60R 21/02* (2006.01)
*B60R 21/00* (2006.01)

(52) U.S. Cl.
CPC ...... *B60R 21/02* (2013.01); *B60R 2021/0097* (2013.01); *B60R 2021/028* (2013.01); *B60R 2021/0293* (2013.01)

(58) Field of Classification Search
CPC ............ B60R 21/02; B60R 2021/0097; B60R 2021/028; B60R 2021/0293
USPC ........................ 472/43, 46, 47; 287/487, 488
See application file for complete search history.

(56) References Cited

U.S. PATENT DOCUMENTS

| | | | | |
|---|---|---|---|---|
| 3,901,550 | A * | 8/1975 | Hamy | B60R 21/02 280/753 |
| 7,677,671 | B2 * | 3/2010 | Steininger | A63G 7/00 297/487 |

* cited by examiner

*Primary Examiner* — Vishu Mendiratta
(74) *Attorney, Agent, or Firm* — Marsh Fischmann & Breyfogle LLP; Kent A. Lembke

(57) ABSTRACT

A vehicle for use in an amusement park ride with upright passenger seating. The vehicle includes a vehicle body and a seat assembly including a seat pan provided in the vehicle body between a front end and a rear end of the vehicle body. The vehicle further includes a passenger restraint system with: (a) a lap bar assembly; (b) a lap bar mount pivotally supporting the lap bar assembly within the vehicle body to pivot about a lap bar rotation axis passing between the seat pan and the front end of the vehicle body; (c) a side leg shield; and (d) a shield articulating assembly concurrently pivoting the side leg shield about a shield rotation axis from an open to a closed position with a pivoting of the lap bar assembly about the lap bar rotation axis from a disengage to an engaged position.

16 Claims, 18 Drawing Sheets

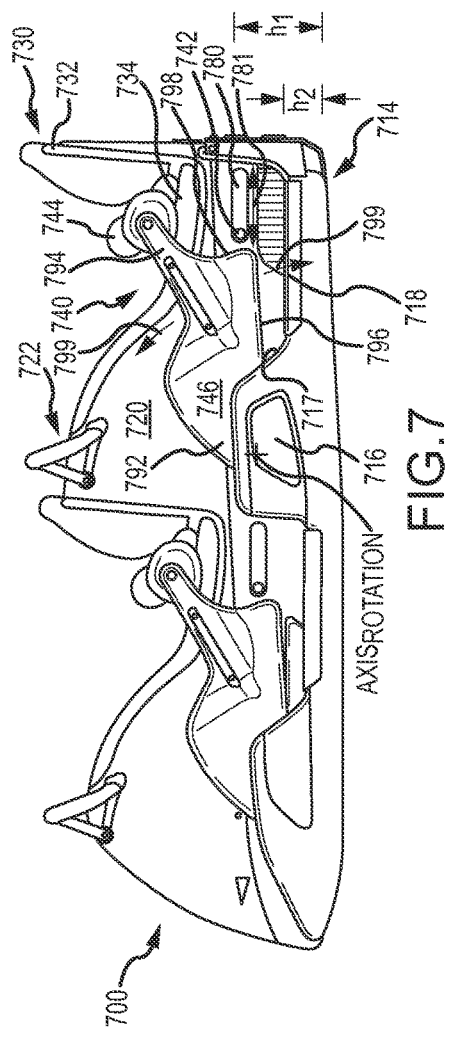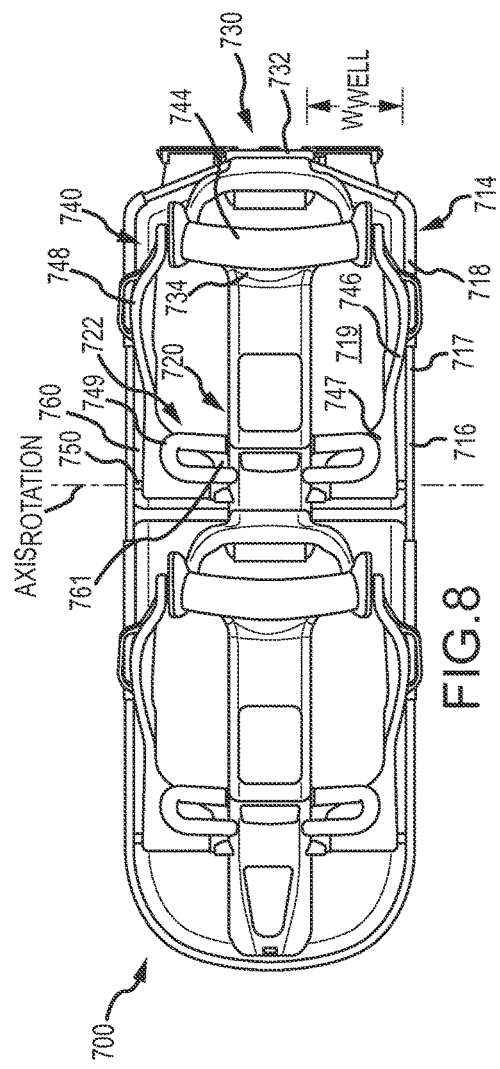

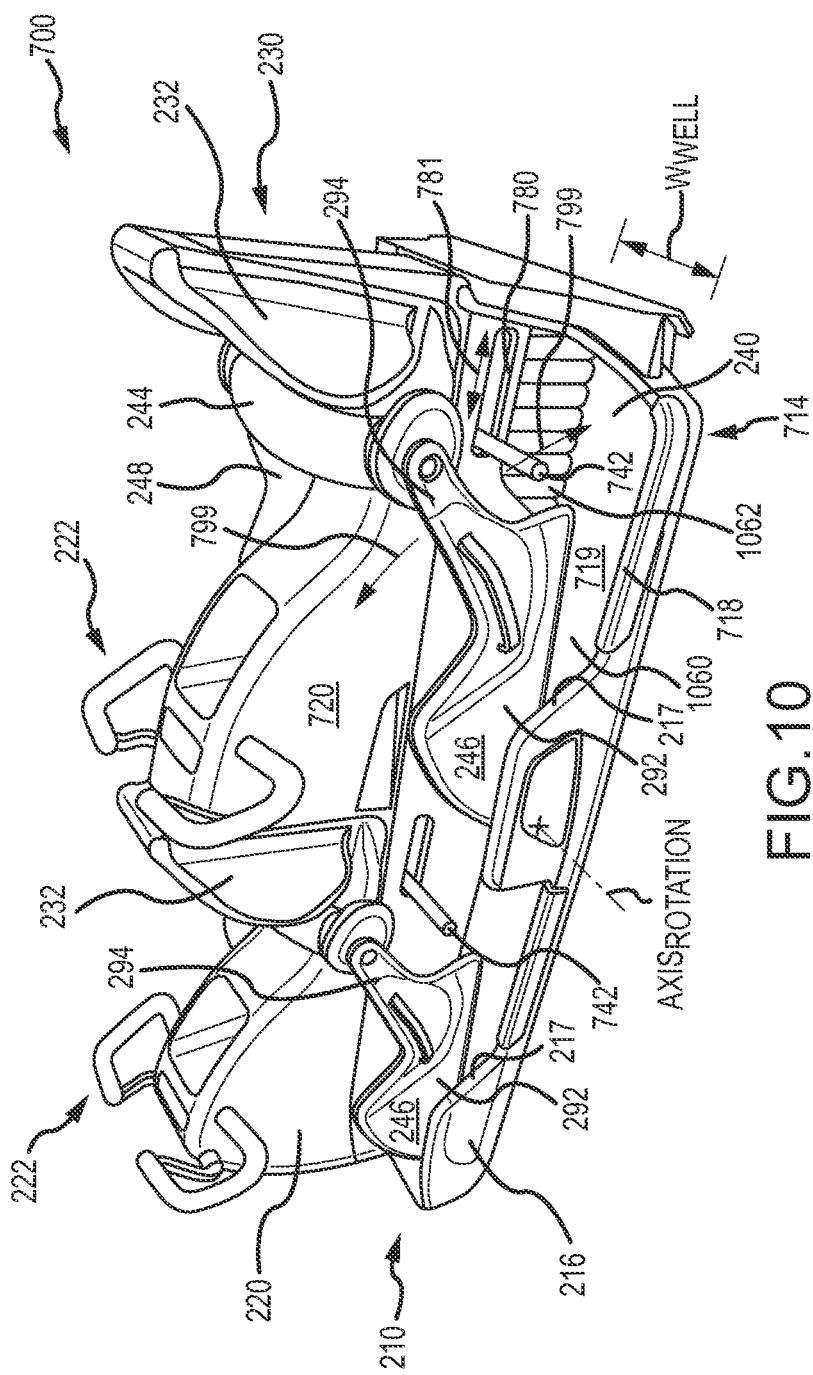

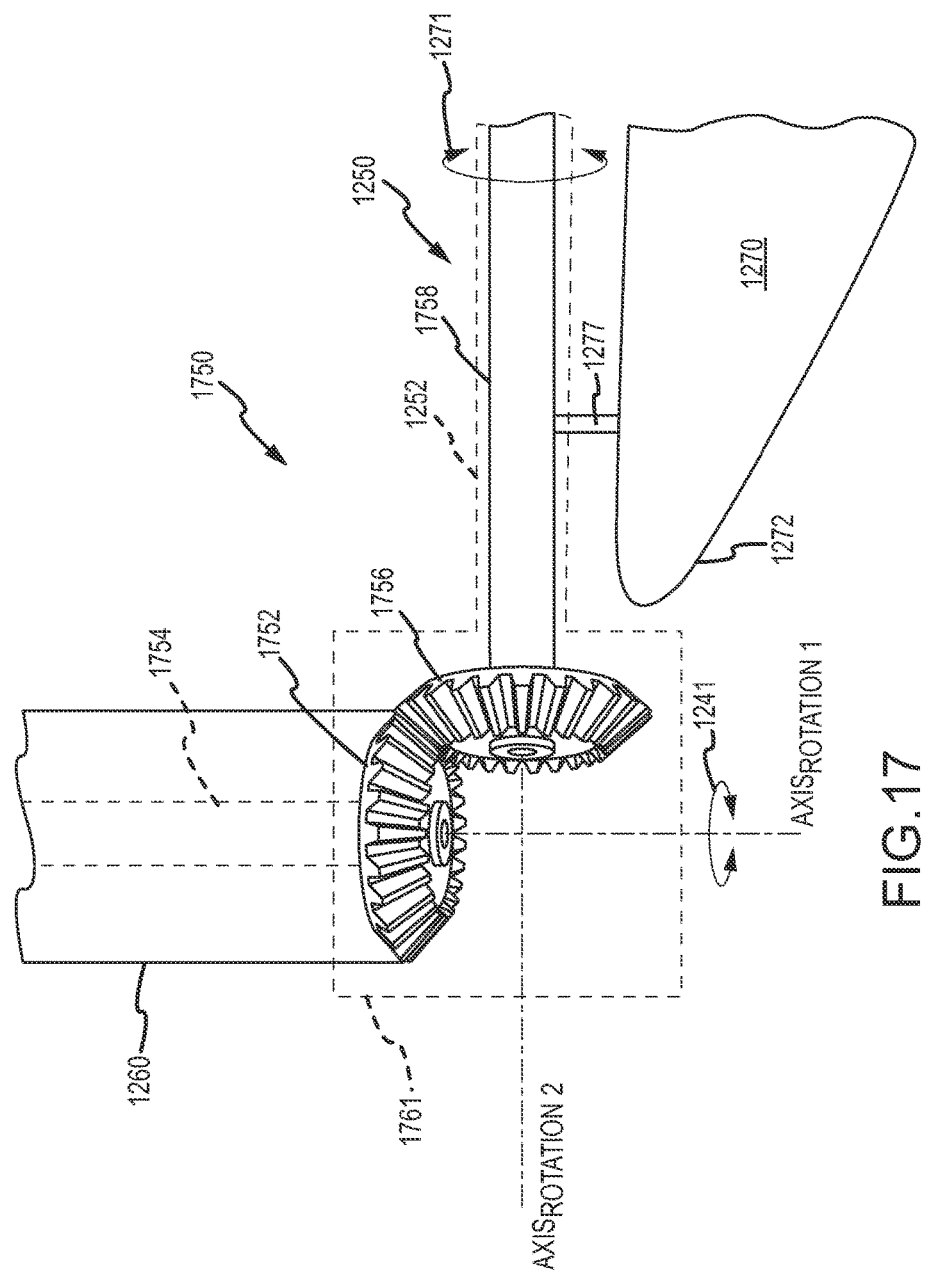

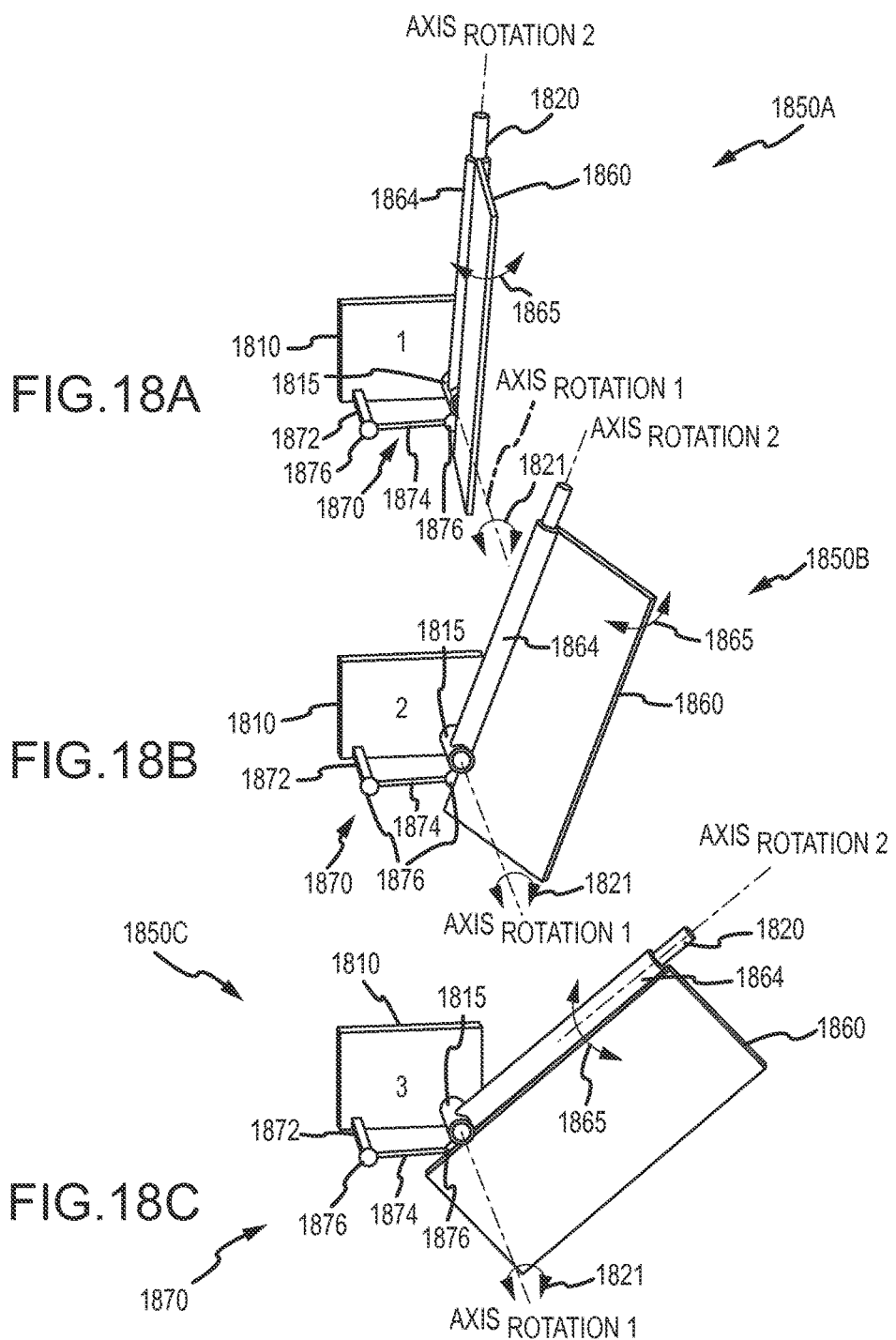

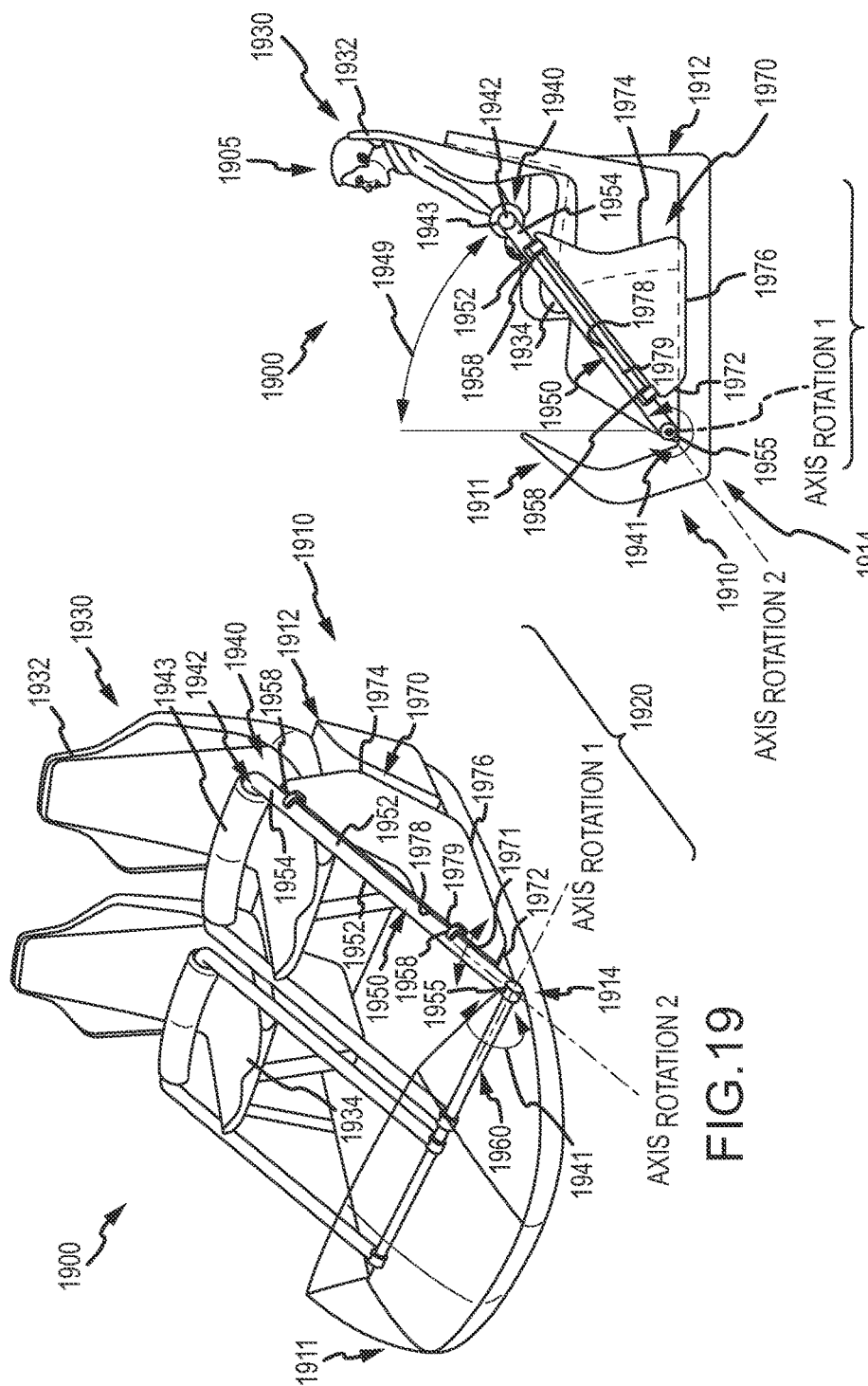

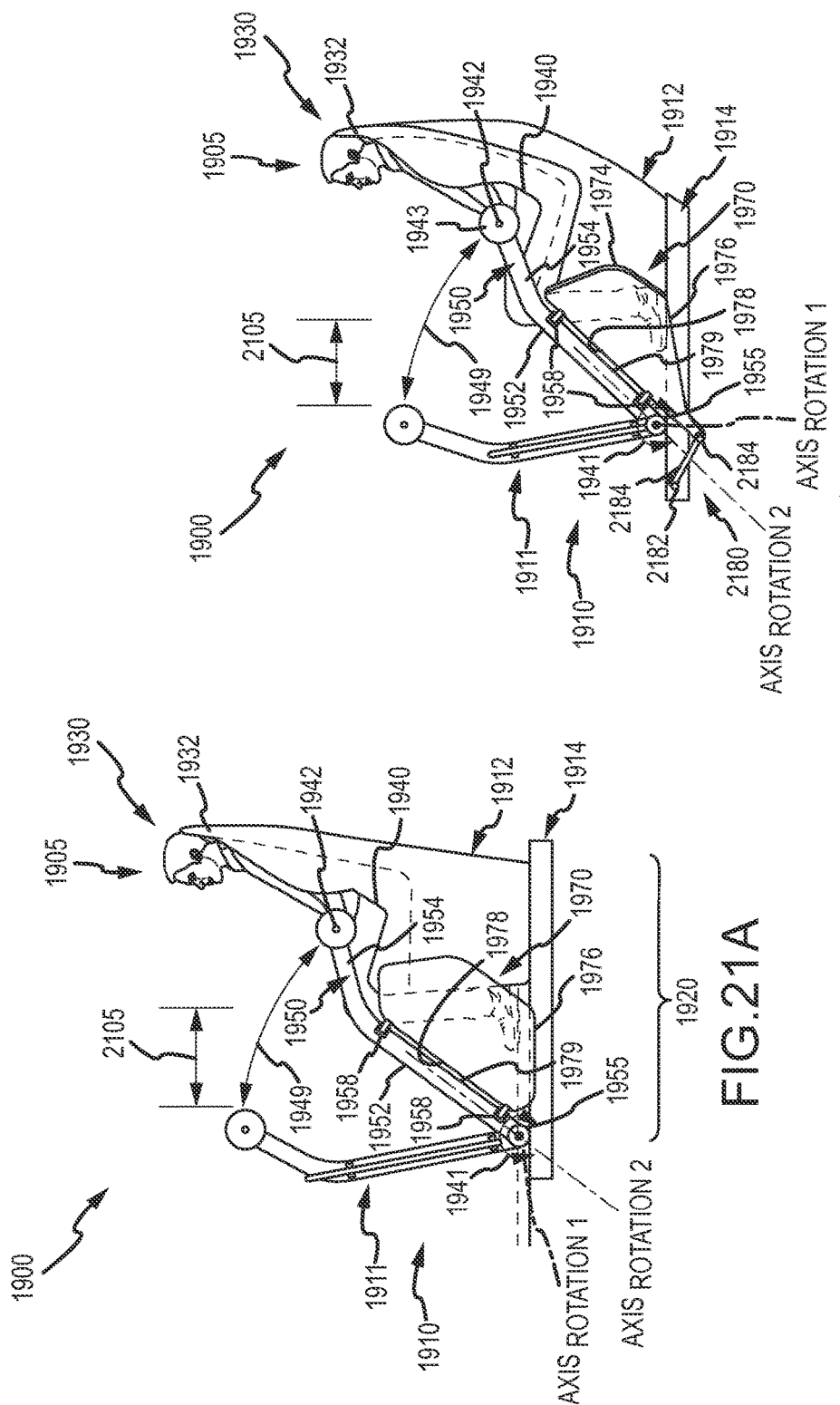

PASSENGER RESTRAINT PROVIDING LATERAL LEG CONTAINMENT IN AN AMUSEMENT PARK RIDE VEHICLE

REFERENCE TO RELATED APPLICATIONS

This application is a continuation-in-part of U.S. patent application Ser. No. 14/521,139, which was filed on Oct. 22, 2014, which is hereby incorporated by reference in its entirety.

BACKGROUND

1. Field of the Description

The present invention relates, in general, to amusement park rides and passenger restraints in such rides and other implementations, and, more particularly, to a passenger restraint system for an amusement park ride in which the passengers are provided with upright and straddle-type seating (e.g., as if riding a motorcycle or similar vehicle) in which their feet are free to dangle (e.g., in a floorless ride vehicle) or other vehicles where leg containment is not provided with the vehicle's body/shell and/or seat design. The restraint system includes a lap bar assembly configured to provide side or lateral constraint of a ride passenger's legs when the lab bar assembly is placed in (or operated to be in) the down or engaged position.

2. Relevant Background

Passenger restraints such as lap bars are used throughout the amusement park industry to safely and securely restrain passengers within a seat of a vehicle. For example, many amusement park rides provide themed rides in which vehicles ride along on one or more tracks, and the passengers are restrained from standing up or leaving the vehicle by a lap bar that is positioned across their laps or provided over their shoulders as an overhead or similar restraint.

During loading in some rides, the lap bar is positioned against the passenger by a ride operator that is pressing a foot lever to allow adjustment of the position of the lap bar relative to the passengers. Once in position, the operator releases the foot lever or pedal to lock the lap bar in this ride or down position. When the ride is over, the vehicle may pass over a portion of the track with a release mechanism causing the lap bar to become unlocked from the ride position. The lap bar then may spring to an open or up position. In other lap bar designs, the lap bar, which may be U-shaped or T-shaped, may be pulled by the passenger toward their lap from a forward position or from a rearward position over their heads (a lap bar restraint with a rear rotating assembly). Once in a securing position close to the passenger's lap, the lap bar assembly may be locked or engaged in position until the end of the ride.

There are a number of concerns with these conventional lap bar assemblies when applied to ride vehicles that utilize upright, straddle-type seating of passengers such as rides that simulate motorcycles, futuristic bikes, and the like. For example, one goal of ride designers is to ensure the passengers' safety throughout the ride, and the ride vehicle may be designed with a body that provides fixed and rigid shields to provide forward and side protection and containment of the passengers' legs. In such cases, the passengers typically have to step over the straddle-type seat and slide their legs into the fixed leg shields or constraints. Then, the lap bar, often a T-shaped bar or an over-the-shoulder bar, is pulled into place. While providing leg constraint and passenger safety, the use of rigid (or fixed-in-place) leg constraints often results in a bulky ride that feels "closed" and is heavily shrouded. Such ride vehicles also may produce slow passenger loading. Some vehicle rides also include rigid behind-the-knee pins to limit backward movement of the passengers' legs once they are seated on the straddle-type seat. In many cases, though, these fixed pins provide another obstacle that has to be avoided or maneuvered around during loading and unloading, which can slow this process and also make it more awkward for the passengers.

Similarly, these ride vehicles may include deep footwells on both sides of the straddle-type seat to protect the passengers' legs and feet and to capture the passengers' footwear should it fall off during the ride. While being effective for these functions, deep footwells can make the ride vehicles more difficult to load and unload as the passengers have to step down into the footwell and swing the leg up and over the seat prior to positioning their lap bar restraint. This can increase the load and unload time and also can result in some accidents as passengers lose their balance. Hence, it would be desirable to provide an amusement park ride vehicle with a passenger restraint system that facilitates an open or minimally shrouded ride vehicle while also facilitating fast loading and unloading of passengers to facilitate higher ride throughputs.

There are a number of ride vehicles that have been designed with a more open design (e.g., with less shrouding) and have been used to provide motorcycle or bike-type ride experiences. Some of these ride vehicles have utilized a passenger restraint that is pivotally mounted at the rear portion of the ride vehicle. Once a passenger is positioned on the straddle-type seat, the restraint can be lowered into a locked position. In some cases, though, these restraints have been used in vehicles in which the passenger is placed in a prone position instead of an upright position, but many rear-mounted restraint designs are not applicable to ride vehicles in which the passengers sit upright.

Further, these rear-mounted restraint systems have typically been used in rides where the length of each vehicle or each vehicle's longitudinal envelope can be relatively large. This is because the train of such vehicles has to be designed to allow a large space between adjacent vehicles so that the restraint can be rotated up and away from passenger at the end of the ride for unloading (and then loading of the next passenger). As a result, these rear-mounted restraints often are not useful or desirable for amusement park rides in which the designer is required to meet a tight or small longitudinal envelope, e.g., where a ride designer is required to keep the passenger space of each vehicle short to allow more passengers to fit on a train of ride vehicles.

In other ride vehicles, it often is difficult to provide lateral leg containment in a ride vehicle specifically designed to allow the passenger's feet to freely dangle. For example, many roller coasters include "vehicles" with bodies that have no floors or bases to support the passenger's feet, and, in some cases, the passengers may sit in an upright position straddling a center podium (e.g., in a ride simulating a flying, futuristic jet cycle or the like). Leg containment within a predefined safety envelope is often more important or limiting in ride design than the arm envelope with regards to passenger safety, and this is especially true in rides without vehicle floors or bases. Presently, most ride and vehicle designers attempt to provide lateral leg containment in floorless or baseless vehicles through specially designed vehicle bodies or shells or unique seat designs, but this can lead to a more enclosed vehicle that fails to provide the open and free dangling feel desired for baseless/floorless vehicles. Alternatively, safety is provided by assuming a much larger reach envelope for the vehicle along its ride path, but this is undesirable as it increases the space needed for the ride and/or limits scenery and set design for the ride (e.g., no near-collision experiences or nearby passing set elements along the ride path).

Hence, there remains a need for a passenger restraint system that is suited for maintaining passenger safety including providing proper leg constraint for passengers that are seated in an upright position on a straddle-type seat in a floorless vehicle or in other vehicles where lateral leg containment is not provided by the vehicle body or seat design. Further, such passenger restraint systems preferably would be suited for rides with shorter trains or with relatively tight or small longitudinal envelopes provided for passenger seating and with little space between adjacent vehicles in the train. Still further, it is desirable for the passenger restraint to facilitate fast loading and unloading of passengers while also meeting other functional goals such as providing capture of footwear.

SUMMARY

The present description addresses the above and other problems by providing a passenger restraint system that is adapted for use with amusement park ride vehicles having upright, straddle-type seating of passengers. For example, the ride vehicle may be designed to provide a motorcycle-type ride experience with the rider sitting upright (and not in a prone position). With the restraint system, the ride vehicle can be open and only minimally shrouded, and passengers will be able to load and unload quickly and safely.

To this end, some embodiments of the restraint system include relatively shallow footwells, a behind-the-knee pin that slides rearward for loading and then forward into an engaged position, and a lap bar assembly located in the vehicle body forward of the straddle-type seat. The footwells are shallow to make loading and unloading less awkward than vehicles having very deep footwells on either sides of the passenger seat, but the depth of the footwells (such as 2 to 6 inches or the like) is large enough to effectively capture loose footwear and other personal items. The behind-the-knee pin acts to limit movement of the passenger's legs rearward within the footwells or parallel to the longitudinal axis of the vehicle body (opposite the direction of travel of the vehicle). The behind-the-knee pin may be positionable via mechanical linkage or other mechanisms connected to the lap bar so as to be actuated with the lap bar assembly (e.g., slid forward into an engaged position when the passenger pulls on the lap bar to place the lap bar in an engaged position near their lap).

The lap bar assembly may be considered an integral unit formed of a U-shaped lap bar that is pivotally supported on the vehicle body such as via a rotation axle or shaft. A pair of front leg shields and a pair of side leg shields may be included in the lap bar assembly and be used to connect the U-shaped lap bar to the rotation axle. In this manner, both pairs of the leg shields pivot with the lap bar from a disengaged or up position that rotates the shields and lap bar forward and away from the passenger seat about the axis of the rotation axle or shaft to provide a passenger a clear and unobstructed path to the straddle-type passenger seat. Once the passenger is seated with their legs straddling a center portion or column of the vehicle body and their feet in the footwells, the lap bar and interconnected front and side leg shields can be rotated toward the seat and the seated passenger to the engaged or down position where it can be locked in place with a locking mechanism. The front leg shields limit (or even block) forward movement of the passenger's legs beyond a predefined location in the footwells (or along a longitudinal axis of the vehicle body) while the side leg shields limit (or even block) sideward or lateral movement of the passenger's legs beyond a predefined distance from the center portion or column of the vehicle body.

More particularly, a vehicle is provided that is adapted for use in an amusement park ride with upright, straddle-type passenger seating. The vehicle includes a vehicle body with a base and a center pedestal portion extending upward from an upper surface of the base. The vehicle also includes a seat assembly including a seat pan mounted on the center pedestal portion between a front end and a rear end of the vehicle body. In practice or use of the vehicle, a passenger seated on the seat pan straddles the center pedestal portion with a left leg on a left side of the center pedestal portion and a right leg on a right side of the center pedestal portion.

The vehicle includes a passenger restraint system that includes a lap bar assembly and lap bar pivotal mount element pivotally supporting the lap bar assembly within the vehicle body to pivot about a rotation axis passing through the vehicle body between the seat pan and the front end of the vehicle body. Further, the lap bar assembly may include a lap bar, a left side leg shield coupled to the lap bar pivotal mount element at a first end and to the lap bar at a second end, and a right side leg shield coupled to the lap bar pivotal mount element at a first end and to the lap bar at a second end. In some implementations, the lap bar assembly is rotatable about the rotation axis from a disengaged position to an engaged position, and a gap (e.g., of less than 3 inches such as about 1 inch) is provided between a lower edge of each of the side leg shields and the upper surface of the base with the lap bar assembly in the engaged position, whereby the left and right legs of the passenger seated on the seat pan are laterally contained within the vehicle (i.e., the passenger cannot swing their legs outward away from the center pedestal portion).

In practice, each of the side leg shields may have a body extending generally parallel to a longitudinal axis of the center pedestal portion. In these cases, each of the bodies of the side leg shields can be spaced apart from the center pedestal portion by a distance (e.g., at least 6 inches), whereby at least a portion of the left and right legs of the passenger seated on the seat pan are positionable between the center pedestal portion and the side leg shields with the lap bar assembly in the engaged position.

In some embodiments of the vehicle, the lap bar assembly further includes a left front leg shield extending outward from the first end of the left side leg shield toward the center pedestal portion. Further, the lap bar assembly may include a right front leg shield extending outward from the first end of the right side leg shield toward the center pedestal portion. In these embodiments, a gap is provided between each of the front leg shields and the upper surface of the base of the vehicle that is less than 3 inches (e.g., about 1 inch gaps). Further, the vehicle body may include left and right footwells adjacent the center pedestal portion, and the left front leg shield may extend across a substantial portion of the left footwell while the right front leg shield may extend across a substantial portion of the right footwell.

In the same or other implementations of the vehicle, the lap bar pivotal mount element may take the form of an axle pivotally supported by the center pedestal portion. In these or other cases, the passenger restraint system may further include a pair of behind-the-knee pins extending outward a distance from opposite sides of the center pedestal portion at locations below and aft of a front edge of the seat pan. In such cases, each of the behind-the-knee pins can be actuated to slide from a first position when the lap bar assembly is in a disengaged position to a second position that is forward of the first position when the lap bar assembly is in an engaged position. In particular vehicles, the behind-the-knee pins can then be mechanically linked to the lap bar assembly to move between the first and second positions with pivotal movement of the lap bar assembly about the lap bar pivotal mount element.

Further, the inventor recognized that there are many vehicles that present additional and/or different passenger restraint challenges that may benefit from other passenger restraint system designs. For example, vehicles without footwells or bases in which a passenger's feet can freely dangle or hang can create challenges in providing leg containment and, specifically, in providing side or lateral leg containment. To address such vehicles and associated leg containment issues, a passenger restraint system is provided and taught herein in which leg containment is achieved through an articulated shield that is either mechanically linked to the lap bar assembly or is actuated (e.g., with a hydraulic, pneumatic, electric, or other actuator design) so as to move (or to be articulated) in conjunction with or as a function of movement of the lap bar.

In this passenger restraint system, a passenger's legs and/or feet may be free to dangle or hang downward when they are seated in the vehicle (e.g., without a floor or footwell supporting their feet), but lateral leg containment is achieved without interfering with the vehicle threshold. The use of an articulating leg shield was proven to be a useful solution after exploration by the inventor of many other design options. The new design for a passenger restraint system is not limited to a particular seating configuration (even though many of the examples in this description show a straddle-type, upright seat with no vehicle floor or base), and it can be used to provide leg (and other passenger) containment in a wide variety of open-type vehicles.

More particularly with regard to these additional embodiments, a vehicle is provided and described for use in an amusement park ride with upright passenger seating. The vehicle includes a vehicle body and a seat assembly including a seat pan provided in the vehicle body between a front end and a rear end of the vehicle body. The vehicle further includes a passenger restraint system that includes: (a) a lap bar assembly; (b) a lap bar mount pivotally supporting the lap bar assembly within the vehicle body to pivot about a lap bar rotation axis passing between the seat pan and the front end of the vehicle body; (c) a side leg shield; and (d) a shield articulating assembly concurrently pivoting the side leg shield about a shield rotation axis from an open to a closed position with a pivoting of the lap bar assembly about the lap bar rotation axis from a disengaged to an engaged position.

In some implementations of the vehicle, the lap bar assembly includes a cross bar and an outer side arm extending from a first end coupled to the cross bar to a second end coupled to the lap bar mount. In these implementations, the side leg shield extends outward from and is pivotally supported by the outer side arm of the lap bar assembly. The shield rotation axis may extend through the outer side arm (e.g., coincides with a longitudinal axis of the outer arm of the lap bar assembly) and is transverse to the cross bar (e.g., to its longitudinal axis or a plane containing its longitudinal axis).

The shield articulating assembly may take the form of a mechanical linkage or an actuator to provide the pivoting of the side leg shield with the pivoting of the lap bar. For example, the mechanical linkage may include a stationary gear mounted on or in the lap bar mount and a nonstationary gear mated with the stationary gear and rigidly coupled with the side leg shield, whereby the side leg shield pivots about the shield rotation axis with movement of the nonstationary gear. In such cases, the passenger restraint system may include a shield support element rigidly coupled with the side leg shield, and the outer arm may have a tubular body (to act as a sleeve). The shield support element can then be positioned within the tubular body, and the nonstationary gear can be affixed to the shield support element, whereby the shield support element pivots within the tubular body of the outer arm when the nonstationary gear moves relative to the stationary gear. In other exemplary implementations, though, the mechanical linkage may be provided with a connecting rod linkage coupling the side leg shield with a rigid frame element of the vehicle body.

In these or other implementations, the vehicle body may include a center pedestal portion extending upward along a longitudinal axis of the vehicle body. A passenger seated on the seat pan would then straddle the center pedestal portion with a left leg on a left side of the center pedestal portion and a right leg on a right side of the center pedestal portion. The vehicle body may be floorless such that the seated passenger has freely dangling feet (e.g., feet that are not supported by a base or floor of the vehicle body). In some cases, the lap bar assembly is pivoted through a first magnitude of angular rotation and the side leg shield is pivoted through a second magnitude of angular rotation that is greater than the first magnitude of angular rotation. In these or other cases, the lap bar rotation axis is in a first plane while the shield rotation axis is in a second plane that is orthogonal to the first plane (i.e., within about 5 degrees of orthogonal is regarded as orthogonal in this case).

BRIEF DESCRIPTION OF THE DRAWINGS

FIG. 7 illustrates a side view of a tandem ride vehicle with an embodiment of a passenger restraint system as described herein and including a lap bar assembly shown to be in the engaged or down (or locked) position;

FIG. 8 is a plan (or top) view of the ride vehicle of FIG. 7 showing a rotation axle or shaft used to pivotally mount the integral front leg shields, side leg shields, and lap bar to the vehicle body and also showing relative positions of the lap bar assembly components to the vehicle body components (e.g., defining a foot well with leg containments in the forward or longitudinal directions and the lateral or side directions);

FIG. 10 illustrates a rear perspective view of the ride vehicle of FIGS. 7 and 8 showing the behind-the-knee pin or peg in more detail and its movement within a guide slot or groove on the vehicle body between an engaged position (shown in FIG. 10) and a disengaged position further aft or rear than the engaged position;

FIG. 17 is a detailed view of a portion of the vehicle of FIGS. 12-16 with several components shown as hidden (or with dashed lines) so as to illustrate components of a shield articulating assembly providing mechanical linking/joining of a shield with a lab bar assembly;

FIGS. 18A-18C are schematic side views of a portion of a passenger restraint system of the present description showing a mechanical linkage approach for implementing a shield articulating assembly;

FIG. 19 is a front perspective view of another vehicle design (with side-by-side seating and a body with a floor or support chassis) incorporating a passenger restraint system of the present description;

FIG. 20 is a side view of the vehicle of FIG. 19; and

FIGS. 21A and 21B are additional side views of the vehicle of FIG. 19 similar to FIG. 20 but showing a seated passenger and showing use of an internal geared linkage and use of an external connecting rod linkage to provide the shield articulation with movement of the lap bar.

DETAILED DESCRIPTION

The following description begins with a discussion of a lap bar restraint system that is designed and configured for achieving positive passenger containment for upright, straddle-type seating within a vehicle body that is open or minimally shrouded. The lap bar restraint system is adapted to support fast loading and unloading of the vehicle while also allowing a vehicle to be short in length (e.g., with a small longitudinal envelope especially when compared with vehicles having a restraint that rotates backward from the passenger and passenger seat or that used prone positioning of the passenger).

The following description then continues with discussion (with reference to FIG. 11 and on) of another useful lap bar or passenger restraint system that provides one or more leg shields adapted to be articulated by or with movement of the lap bar from its disengaged position to its engaged position so as to be moved from an open or non-containment position to a closed or containment position (and with opposite articulated positioning when moving from the lap bar's engaged position to disengaged position). The described passenger restraint system allows for leg containment in ride vehicles where the passenger's feet are allowed to freely dangle (e.g., in floorless ride vehicles) as well as in other ride vehicles in which leg containment is not achieved through the vehicle's body/shell and/or with the vehicle's seat design. The passenger restraint system of these embodiments aids in decreasing seat pitch (e.g., in tandem configurations of a vehicle), which in turn decreases ride vehicle and train length. The lap bar with articulated leg shield also allows for quicker load and unload times due to an increased ease of general passenger ingress into and egress out of the vehicle in which the passenger restraint system is installed.

The lap bar restraint system uses and leverages upon a U-shaped or U-type lap bar with interconnected (or integral) leg shielding and containment for front and side leg containment. Further, the lap bar restraint system includes, in some cases, articulating (or sliding) behind-the-knee bars, pegs, or pins to limit or constrain movement of the passenger's legs rearward within footwells on either side of the straddle-type passenger seat. The behind-the-knee pins may be operated independently from the lap bar (e.g., actuated mechanically or electrically operated to move the pin from a disengaged or aft position to an engaged or forward position). In other cases, the lap bar and behind-the-knee pin are mechanically linked together such that the pin is passenger-actuated by moving the lap bar in and out of an engaged or locked position (e.g., pulling down and/or rearward on the lap bar to move it into an engaged position near their lap acts to concurrently slide the pins forward toward or against the backs of their legs).

Figure 1:
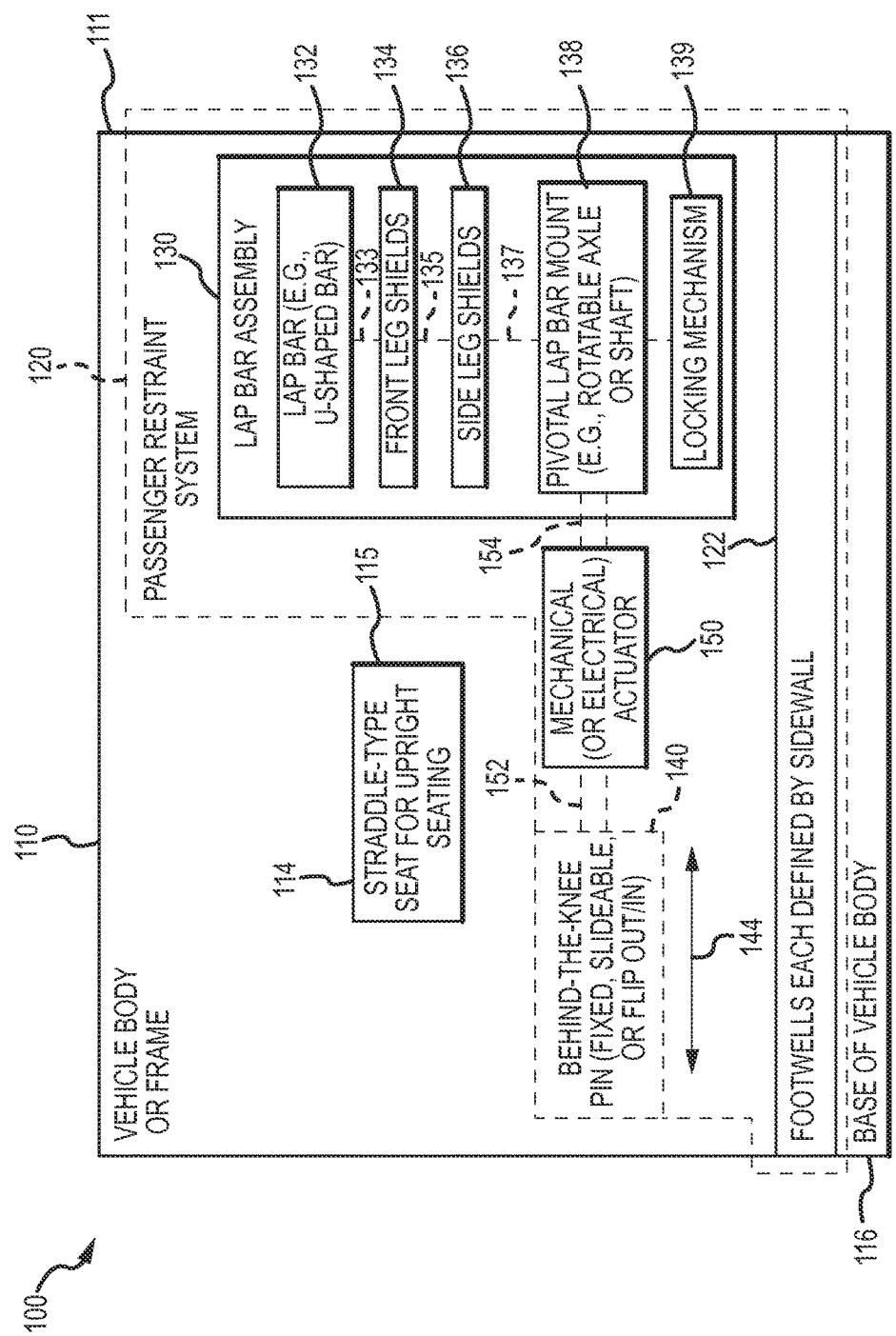
FIG. 1 is a functional block diagram of a ride vehicle for use in an amusement park ride (e.g., a train type ride with interconnected or linked sets of such vehicles) with a passenger restraint system of the present description.

FIG. 1 illustrates a functional block diagram of a ride vehicle 100 for use in an amusement park ride such as a train-type ride in which a number of such vehicles would be linked together and travel along a ride path or on a ride track (e.g., roller coaster or similar ride). The ride vehicle 100 includes a vehicle body or frame 110 upon which a straddle-type seat 114 is mounted, and the body 110 and seat 114 are configured to provide passengers with upright seating (e.g., not typically for use with passengers in a prone position). The front of the vehicle 110 is shown at 111 with a passenger using the seat 114 facing toward the front 111 of the vehicle 110 and the front or leading edge 115 of the seat 114.

The ride vehicle 100 includes a passenger restraint system 120 mounted on the vehicle body or frame 110. The passenger restraint system 120 is designed to ensure passenger safety while also addressing goals of fast ingress/egress (loading and unloading), safe and easy ingress/egress, and footwear capture. To provide footwear capture, the system 120 includes right and left footwells 122 on opposite sides (right and left sides) of the straddle-type seat 114. The footwells 122 typically are defined by vertical (or upward extending) sidewalls attached to a base or platform 116 of the vehicle body 110 such as at outer, side edges of the base/platform 116. These sidewalls may be relatively short, such as with a height of 2 to 6 inches (e.g., 3 inches in some cases), to provide shallow footwells 122 to aid in easy and safe loading of the vehicle 100 while still acting to capture any loose footwear or other passenger items.

More significantly, the passenger restraint system 120 includes a lap bar assembly 130 that is configured to provide a tight or short longitudinal envelope (e.g., short passenger pitch). To this end, the lap bar assembly 130 is mounted toward the front 111 of the vehicle body 110 or forward of the seat 114 (and a passenger on the seat 114). The lap bar assembly 130 includes a lap bar 132 such as a U-shaped, rigid bar or pole that a passenger on the seat 114 pulls downward toward their lap to engage the lap bar 132 at the beginning of a ride with vehicle 100 and that releases upward and forward at the end of the ride. To this end, the lap bar assembly 130 includes a pivotal lap bar mount 138. For example, the mount 138 may take the form of an axle or shaft that is attached to the body or frame 110 to be rotatable about its central, longitudinal axis while other mounts may be utilized (e.g., bearing surfaces on the body 110 that support the ends of the bar 132 or portions of the shields 134, 136 and allow for rotation or pivoting of the lap bar 132). The lap bar assembly 130 also includes a locking mechanism 139 that acts to engage and lock the lap bar 132 (or the pivotal mount 138) in the engaged position during use of the vehicle 100 in a ride and to disengage and unlock the lap bar (or the pivotal mount 138) at the end of a ride (as is well-known in the ride industry and, therefore, not discussed in further detail herein).

The lap bar assembly 130 further includes front (or longitudinal) leg shields (i.e., right and left front leg shields) 134 that are designed to extend outward from the body 110 in a direction that is transverse or even orthogonal from the longitudinal axis of the body 110 (e.g., transverse to the direction of travel of the vehicle 110 when in use in an amusement park ride). In this way, the shields 134 act to contain a passenger positioned on the seat 114 from moving their legs forward beyond a predefined location (e.g., beyond the location of the front shields 134 relative to the vehicle body/frame 110). Additionally, the front leg shields 134 may be configured to limit or prevent the passenger from lifting or moving their legs upward away from the base 116 (e.g., out of the footwells 122) when the lap bar assembly 130 is in the engaged or down position.

The front leg shields 134 are positioned forward of the seat 114 and are often located between the lap bar 132 (when it is in the engaged or down position) and the pivotal lap bar mount 138. Further, in some cases, the lap bar assembly 130 may be thought of as an integral or unitary assembly with the lap bar 132 being rigidly (or otherwise) interconnected with the pivotal lap bar mount 138 via the front leg shields 134 (and/or side leg shields 136) as shown via dashed lines 133, 135, and 137. Stated differently, the front leg shields 134 may act both as a forward containment of a passenger's legs in the vehicle body 110 and also act to interconnect and rigidly support the lap bar 132 such that the lap bar 132 may be pivoted from a disengaged or "up" position to an engaged or "down" position by rotating the mount 138 to which the front leg shields are affixed (e.g., one end of each shield 134 may be connected to an end of the lap bar 132 while the other or second end of each shield 134 is attached to or coupled with the axle/shaft or other pivotal lap bar mount 138) such that movement of the lap bar 132 causes the axle/mount 138 to rotate upon the body/frame 110 and also concurrently causes the front leg shields 134 to be moved between a disengaged position and an engaged (or forwardly contained) position.

As shown, the lab bar assembly 130 further includes side (or right and left) leg shields 136 that are configured to protect and/or constrain legs of a passenger seated on the straddle-type seat 114. Particularly, the side leg shields 136 may be designed and configured such that when the lap bar 132 is pivoted on mount 138 into the engaged or down position the side leg shields 136 function to limit sideward or outward movement of a passenger's legs away from the seat 114 and body/frame 110. For example, the side leg shields 136 may be configured to prevent movement of the passenger's legs beyond a predefined distance from the body/frame 110 (or the portion of a center portion of the body that is forward and below the seat 114), e.g., provide space for the passenger's feet, calves, and/or thighs but only allow lateral movement (i.e., movement orthogonal to the longitudinal axis of the body 110) of a safe and preset magnitude (e.g., less than 18 inches, less than 12 inches, or some other predefined maximum amount of lateral or side leg movement). Each of the side leg shields 136 may be connected to or extend out from one of the front leg shields 134 as shown with dashed line 135. The side leg shields 136 may rotate with movement of the front leg shields 134. In other cases, the side leg shields 136 may interconnect the front leg shields 134 and the lap bar 132.

In some ride vehicles 100, it may be useful to further constrain a passenger's movement of their legs when on the seat 114 by limiting the amount of rearward movement of the passenger's legs (e.g., in a direction opposite the direction of travel of the vehicle 110 or away from the front 111 of the body 110 along a longitudinal axis of the body 110). To this end, the passenger restraint system 120 may include a behind-the-knee pin or peg 140 positioned on the body 110 at a location rearward or aft of the lap bar assembly 130. The pin 140 is provided below the seat 114, with the height of the pin 140 relative to the base 116 of the footwell 122 and distance of the pin 140 from the seat 114 (in the engaged position) being selected to limit rearward movement of a leg (e.g., foot or calf) of a passenger on the seat 114. This constraint is provided in combination with the side leg shields 136 as the passenger's leg is constrained by sideward or lateral movements away from the body 110 by the side leg shield 136 and from rearward movements by the pin/peg 140.

The behind-the-knee pin 140 may extend outward from the body 110 a predefined distance (e.g., about the width of a footwell 122 or a greater distance), which may coincide with a location of the side leg shields or the pin 140 may extend out some distance beyond the side leg shield 136. The pin 140 may be fixed in place in an engaged position. In other cases, though, it may be desirable for the pin 140 to be positionable between a disengaged position and an engaged position as shown with arrow 144, with such embodiments being useful for facilitating passenger loading and unloading.

To this end, a mechanical or electrical actuator (or linkage) 150 can be provided to move 144 the pin 140 into the engaged position upon operation of the lap bar assembly 130 to move the lap bar 132 and shields 134, 136 into their engaged positions. For example, the actuator 150 may be a mechanical linkage as shown at 152, 154 that interconnects the pin 144 with the pivotal lap bar mount 138 such that when the mount 138 is rotated or operated to move the lap bar 132 into an engaged position the pin 140 is slid forward 144 from a disengaged position (aft position) to an engaged position (forward position more proximate to the lap bar assembly 130 and the front of the body 111). This forward sliding actuation may cause the pin 140 to slide 144 (in a groove or slot on the body 110 in some cases) several-to-many inches (e.g., slide 4 to 12 inches or more forward toward the front edge 111 of the body 110).

In other cases, the pins 140 may have a disengaged position in which the pin 140 is more proximate to the sides of the body 110 below the seat 114 and the engaged position is when the pin 140 is rotated or flipped outward as shown with arrow 144 to an orientation transverse to the longitudinal axis of the body 110 (e.g., to have the longitudinal axes of the right and left pins moved from being parallel or substantially parallel to the longitudinal axis of the body 100 to being transverse or even orthogonal to this longitudinal axis). This sliding forward (and then backward at the end of a ride) or flipping outward (and then back inward) may also be performed with an electronic (or other actuator) that is not interconnected with the lap bar assembly 130 but that can act concurrently or independently of the lap bar assembly 130 to provide the movement 144 to place the pin 140 in the engaged position (and then return it to the disengaged position).

FIGS. 2-6 illustrate one useful implementation of a ride vehicle 200 that makes use of the passenger restraint techniques described herein, and, particularly, includes components useful for implementing a passenger restraint system (such as system 120 of FIG. 1) in a vehicle adapted for upright, straddle-type passenger seating. While not shown, the ride vehicle 200 may be used in a variety of amusement park rides such as a train-type ride (e.g., a roller coaster or the like) with a plurality of the ride vehicles 200 linked together end-to-end as the passenger restraint provided in the vehicle 200 supports a relatively small passenger envelope and overall ride vehicle length and also supports easy, safe, and quick ingress and egress.

Figure 2:
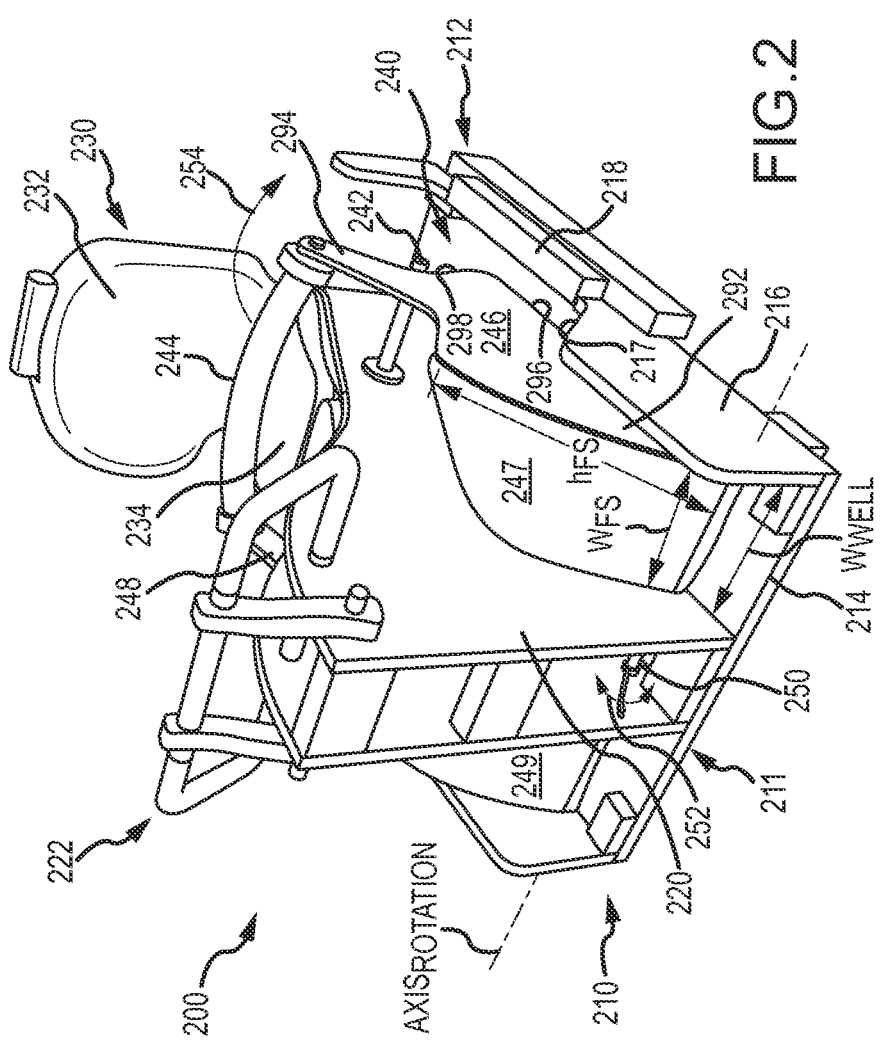
FIG. 2 is a front perspective view of a ride vehicle with a passenger restraint system of the present description, with the lap bar assembly shown in the engaged or down (or locked) position.

FIG. 2 is a front perspective view of the ride vehicle 200, with no passenger shown in the vehicle 200. The ride vehicle 200 includes a body or frame 210 having a front or front end 211 and a back or rear end 212. The body 210 includes a base or platform 214, which may be a rigid and planar plate or the like. The body 210 also includes, on each side, a sidewall 216 extending upward from an upper surface of the base 214, and the sidewall 216 includes a recessed segment 217 that extends a smaller distance from the base 214 to define an access or opening to the vehicle 200 for a passenger. A step plate 218 is provided in this access or opening in wall 216 to facilitate safe and less awkward ingress and egress by passengers.

The body 210 further includes a center portion or column 220 also extending upward from and supported upon the base 214. The center portion 220 of the body 210 is shown to be positioned or disposed between the left and right sidewalls 216, and it is used to support a handle bar or steering assembly 222, e.g., handles for a passenger to grip such as to simulate a motorcycle or similarly designed vehicle, at an upper and forward location (e.g., near the front 211 of the vehicle 210). The center portion 220 is also used to support a seat assembly 230 in the form of a back support 232 and a pan 234, and, as a result, the seating on seat assembly 230 is straddle-type seating as a passenger positions one leg on either side of the center portion 220 when in the seat pan 234. The seating is "upright" in that the passenger has their back supported by the seat back 232 in a vertical or near vertical arrangement rather than leaning forward in a prone position.

Footwells are defined on either side of the center portion 220 by a combination of the outer sidewalls of the center portion 220, the upper surface of the base 214, and inner surfaces of the sidewalls 216 with the step plates 218. The footwells extend along center portion 220 and sidewalls 216 and are configured for receiving a passenger's left and right legs and feet. To this end, the footwells have a width, $W_{Well}$, that is some amount greater than the largest anticipated passenger's legs and/or or feet, e.g., 6 to 12 inches or more in some implementations.

As shown in FIG. 2, the sidewalls 216 have a first height, $h_1$, for sections that are located forward and aft of the seat pan 234, and a second height, $h_2$, in the recessed section 217 where the step plate 218 is provided. The second height, $h_2$, may be chosen to be great enough to capture footwear or other items that may be lost by the passenger in the vehicle 200 or become loose and drop into one of the footwells. In some cases, the first height, $h_1$, is in the range of 6 to 18 inches while the second height, $h_2$, is 2 to 4 inches so as to define an access or opening in sidewalls 216 that facilitates easy access to the vehicle 200 and its seat pan 234 while still being useful for capturing footwear. This arrangement also avoids issues with deep footwells that can be awkward for passengers to navigate.

Significantly, the vehicle 200 is designed to provide forward (or longitudinal (i.e., forward along the longitudinal axis of the body 210), lateral (or sideward), and rearward containment of the legs of a passenger seated in the seat assembly 230. The seating is straddle-type seating as a passenger seated on the seat pan 234 would position their left and right legs on the left and right sides, respectively, of the center portion 220 of the vehicle body 210 with their left and right feet in the left and right footwells. The footwells with the sidewalls 216 would not provide adequate containment during ride operations without further restraints as the passenger could readily swing their legs over the step plate 218 and/or the top of the sidewalls 216 at other positions along its length.

To provide enhanced leg and/or foot containment, the ride vehicle 200 includes a lap bar assembly 240 and left and right behind-the-knee pins 242 (which together provide a passenger restraint system in the vehicle 200). The lap bar assembly 240 is adapted to restrain a passenger within the seat pan 234 and also to provide longitudinal and lateral leg constraint of both of the passenger's legs. To this end, the lap bar assembly 240 includes a lap bar 244 that is pivotally supported within the ride vehicle body 210 with a pivotal lap bar mount 250.

Figure 3:
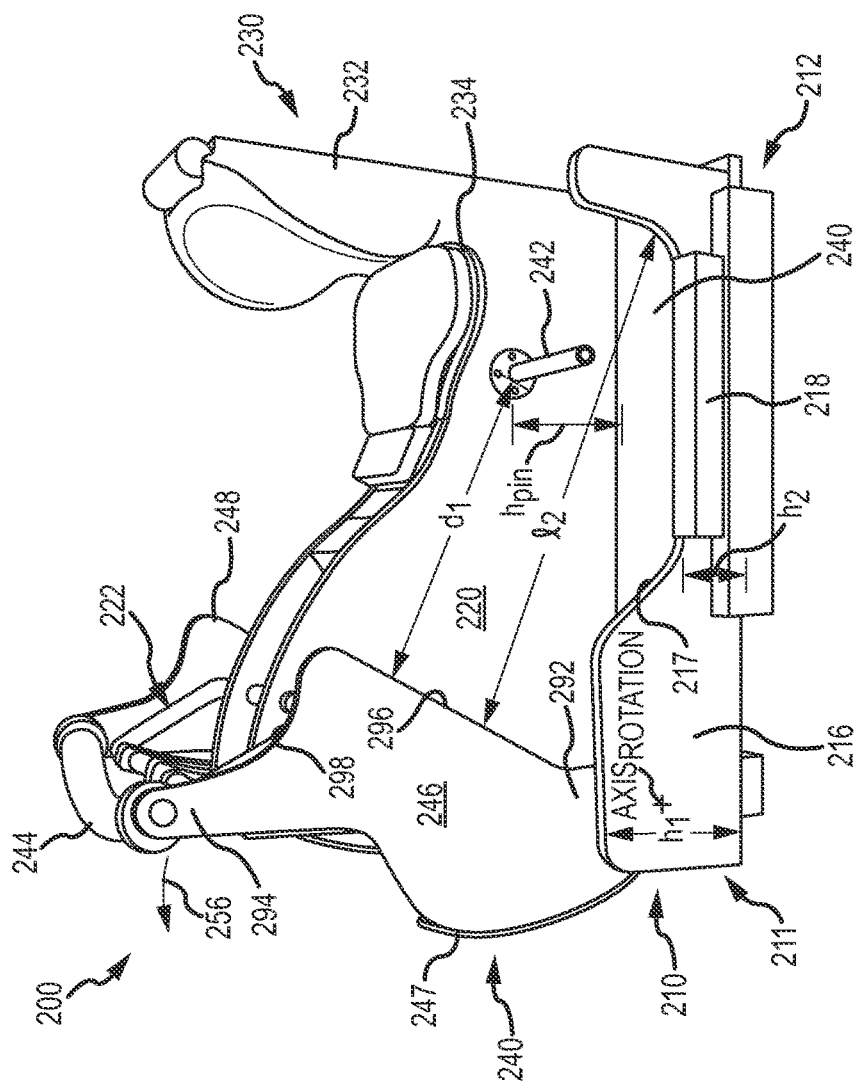
FIG. 3 is a side view of the ride vehicle of FIG. 2 with the lap bar assembly shown in the disengaged or up (or unlocked) position.

As shown, the pivotal lap bar mount 250 may be provided with an axle or shaft that extends all or a portion of the width of the body 210 and which may be pivotally supported (e.g., upon one or more bearings or bearing surfaces) provided in the center portion 220 of the body 210. When a passenger pulls down as shown with arrow 254 (or pushes up upon) on the lap bar 244, the axle or mount 250 rotates about the rotation axis, $Axis_{Rotation}$ (or linear axis of the axle 250) as shown with arrow 252. In this way, the lap bar 244 can be moved from a disengaged or up position (as shown in FIG. 3) to an engaged or down position (as shown in FIG. 2). A locking mechanism, not shown, would typically be included in the vehicle to lock the lap bar assembly at least in the engaged position (e.g., during ride operations) and often also in the disengaged position to facilitate safer unloading of the vehicle 200.

In contrast, though, to conventional U-shaped lap bars, the lap bar assembly 240 further includes a left side leg shield 246, a left front leg shield 247, a right side leg shield 248, and a right front leg shield 249. The left side leg shield 246 is provided to contain a passenger's left leg within the left footwell by limiting movement of the passenger's left leg in a lateral direction outward from the center portion 220 of the body 210 while the right side leg shield 248 is provided to contain the passenger's right leg within the right footwell by limiting movement of the passenger's right leg in a lateral direction outward from the center portion 220 of the body 210.

To this end, as shown for left side leg shield 246, the shield 246 may be a planar (or curved) member with a length (e.g., 2 to 4 feet or the like) as measured between a first end 292 and a second end 294 that allows it to extend from the front end 211 of the vehicle body 210 to the seat pan 234 (or to a mid or further aft point of the seat pan 234) when the lap bar assembly 240 is positioned in the engaged or down position (as shown in FIG. 2). It is desirable for the shield 246 to rotate in and out of an engaged position with the lap bar 244, and, to achieve this goal, the shield 246 is affixed at its first end 292 to the rotation axle or shaft 250 and at its second end 294 to an end of the lap bar 244. In other words, the lap bar 244 and the shields 246, 248 can be provided as an integral or unitary member that rotates about the rotation axis, $\text{Axis}_{Rotation}$ (i.e., the bar 244 and all shields 246, 247, 248, and 249 rotate together in and out of the engaged position shown in FIG. 2 as shown with arrow 254 and rotation arrow 252 for axle/shaft 250).

In the disengaged position as shown in FIG. 3, the side leg shield 246 is moved forward of seat pan 234 and the access or opening in the sidewall 216 to allow a passenger to access the seat assembly 230. In this position, a lower edge 296 may be spaced apart a distance, $d_1$, from the behind-the-knee pin 242 and a distance, $d_2$, from a back edge of the recessed segment 217 (where the sidewall 216 returns to its greater height, $h_1$) with these distances being chosen to facilitate safe and non-awkward access such as with $d_1$ being in the range of 2 to 3 feet and $d_2$ being in the range of 3 to 5 feet. In the engaged or down position as shown in FIG. 2, the side leg shield 246 is swung down toward the base 214 and has end 294 adjacent to the seat pan 234 and pin 242 (but with a gap of at least 1 inch between the pin 242 and the rear edge 298 of the shield 246 to avoid creation of a pinch point). The side leg shield 246 is spaced apart a distance from the nearby outer surface of the center portion so as to provide a space for receiving a passenger's leg, such as a distance that is less than the width of the well, $W_{Well}$, by 1 inch or more to avoid a pinch point between the shield 246 and wall 216 (or a distance in the range of 10 to 16 inches or the like).

In addition to lateral or sideward containment, it may be desirable in many vehicles 200 to also limit the amount of forward or longitudinal (in the forward direction) movement of a passenger's legs. To this end, the lap bar assembly 240 also includes a left front leg shield 247 and a right front leg shield 249. The left front leg shield 247 is provided to contain a passenger's left leg within the left footwell by limiting movement of the passenger's left leg in a forward or longitudinal direction (e.g., along the length of the body's center portion 220 away from the seat pan 234 toward the front edge 211 of the vehicle body 210) while the right forward leg shield 249 is provided to contain the passenger's right leg within the right footwell by limiting movement of the passenger's right leg in a forward or longitudinal direction (e.g., along the length of the center portion 220 away from the seat pan 234 toward the front edge 211). For example, it may be desirable to block travel of the passenger's feet and legs beyond a point some distance from the front edge 211 of the body 210 (or some distance forward from the seat pan 234).

To achieve this goal, as shown with left front leg shield 247, the front leg shield 247 is affixed to the side leg shield 246 (e.g., to an edge opposite the lower edge 296), and the leg shield 247 is positionable from an engaged position shown in FIG. 2 to a disengaged position shown in FIG. 3 with movement of the side leg shield 246 (and lap bar 244) about the rotation axis, $\text{Axis}_{Rotation}$. The front leg shield 247 extends transverse to a plane extending through the side leg shield 246 so as to act as a containment member for the right footwell. In other words, the front leg shield 247 blocks travel of items such as a passenger's foot and/or leg beyond its location in the footwell. The shield 247 has a width, $W_{FS}$, that nearly matches (at least at its sections near the base 214) the width, $W_{Well}$, of the footwell so that a passenger cannot move their foot and/or leg outside the footwell in the forward or longitudinal direction. In some cases, the width, $W_{FS}$, is two inches or more less than the width, $W_{Well}$, to provide adequate clearance (e.g., 1 inch or more) on its inner and outer edges to avoid pinch points and provide clearance for its movement within the footwell of the vehicle 200. Further, to provide forward leg containment, the shield 247 has a height, $h_{FS}$, (e.g., 12 to 36 inches or the like) that makes it difficult for a passenger to lift their leg out of the footwell with the shield 247 in the engaged or down position (e.g., the shield 247 typically will extend some distance over the passenger's foot and leg such as over their knee and a portion of their thigh blocking upward movement as well as blocking movement of their foot past the forward edge of the shield 247 such as beyond the axle/shaft 250 in the vehicle 200).

To further contain the passenger's legs in the vehicle 200, pins or pegs are provided in the footwells or adjacent the center portion 220 to limit rearward movement or movement toward the rear or aft edge 212 of the vehicle 200. As shown in FIGS. 2-6, a behind-the-knee pin 242 is included (one would be provided on both sides of the center portion 220 of the body 210) that extends transverse to the outer surface of the center portion 220 into the footwell (or a distance such as 6 to 12 inches outward toward the sidewalls 216). As shown more clearly in FIG. 3, the pin 242 is typically positioned below the seat pan 234 at a height, $h_{Pin}$, above the base 214 (e.g., 4 to 10 inches above the base 214) so as to block rearward movement (e.g., movement along the longitudinal axis of the vehicle 210 in a direction toward the rear or aft edge 212 of the body 210) of a passenger's legs and/or feet so as to retain the leg within the containment provided by the shields 246 and 247 (and footwell of the vehicle 200). The pin 242 may be positioned at a center point of the seat pan 234 or in another position relative to the pan 234 such as further aft toward the back edge 212 of the body 210.

The behind-the-knee pin 242 may be a fixed and rigid element as shown in FIGS. 2-6. In other cases, though, the behind-the-knee pin 242 may be adapted to rotate from a disengaged position where it is flush (or nearly flush) with an outer surface of the center portion 220 of the body 210 to an engaged position (e.g., the position shown in FIG. 2-6). This rotation may be actuated by a mechanical linkage with the lap bar assembly 240 (e.g., with the shaft 250) such that its rotation (or flipping inward and outward) occurs automatically with movement of the lap bar 244. In other cases, the actuation may be automated and triggered by movement of the lap bar 244 (or another trigger) such as with electric motors or the like. Instead of flipping outward (and inward), the pin 242 may slide within a groove from a disengaged position further aft (to facilitate easy and less awkward egress) to an engaged position (as shown in FIG. 3 for example). Such an embodiment is shown in the vehicle 700 shown in FIGS. 7-10 and described in more detail below.

Figure 4:
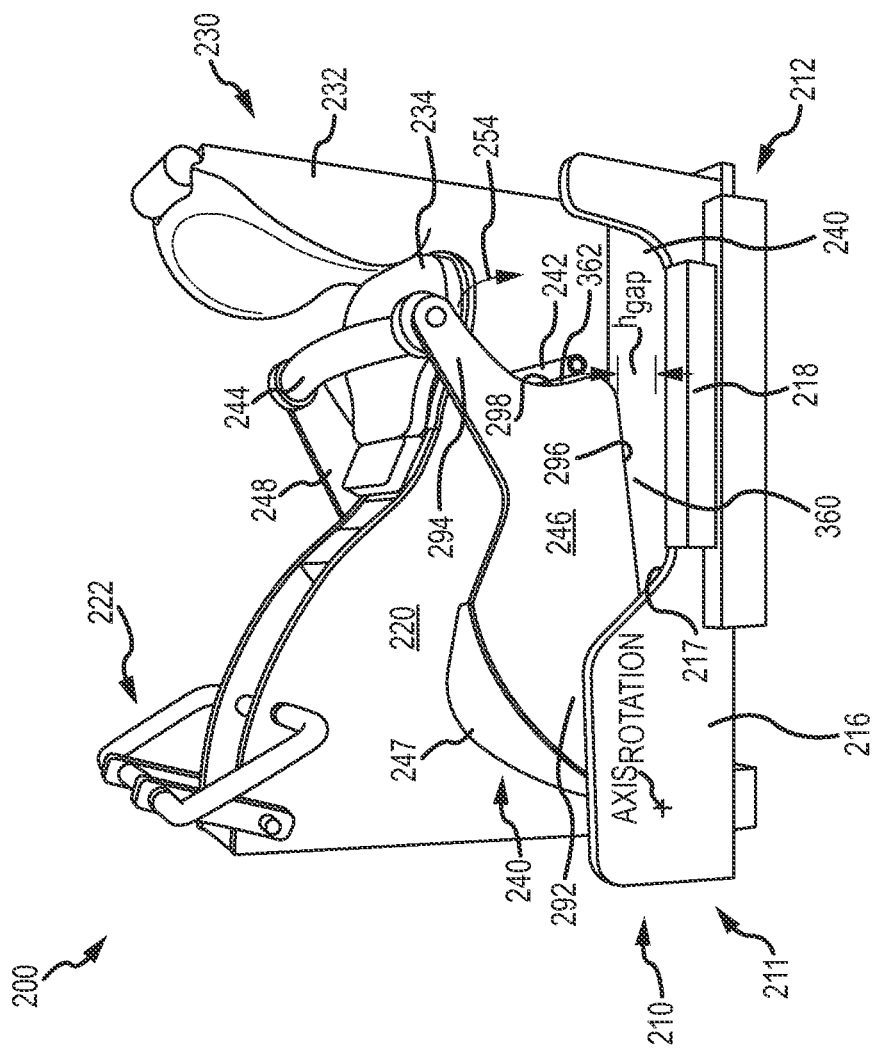
FIG. 4 is a side view of the ride vehicle of FIGS. 2 and 3 with the lap bar assembly shown in the engaged or down (or locked) position.
Figure 6:
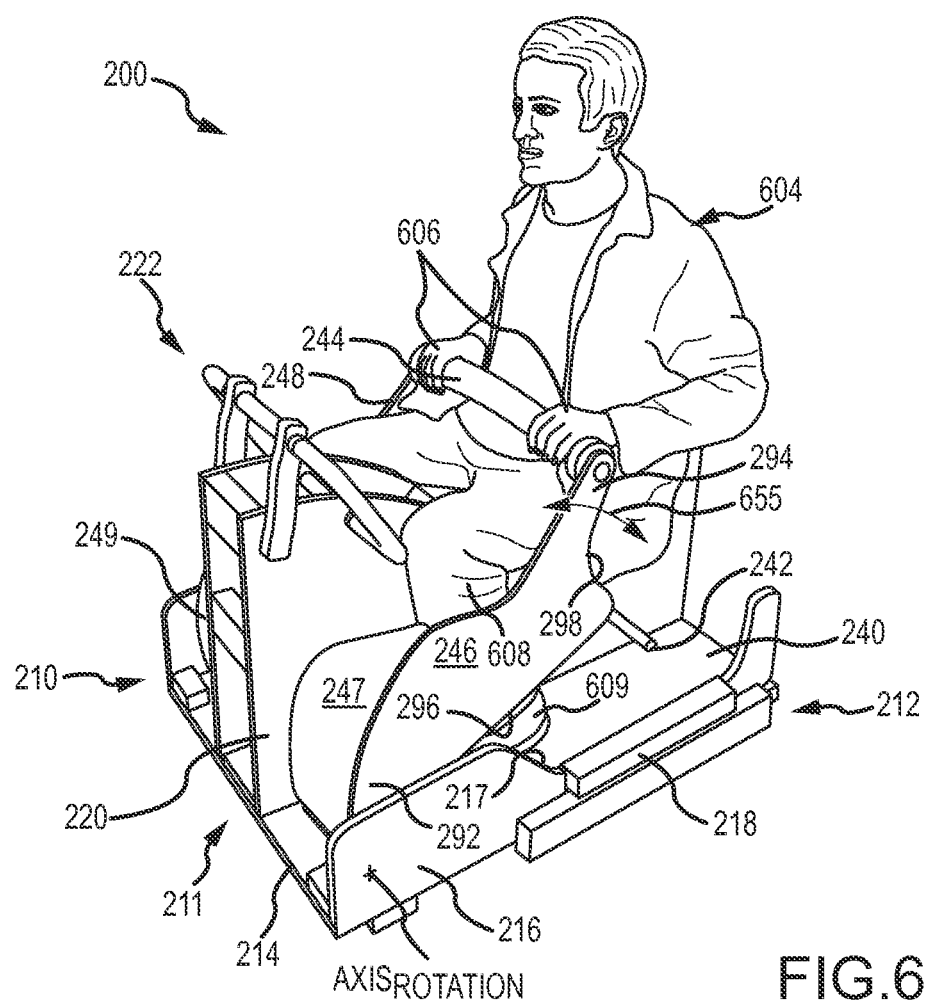
FIG. 6 is a perspective view of the ride vehicle of FIGS. 2-5 similar to that of FIG. 2 but with a ride passenger seated in the vehicle seat and with his movement constrained by the engaged passenger restraint system including the lowered lap bar assembly with its front and side leg shields.

FIG. 4 shows a side view of the vehicle 200 with the lap bar assembly 240 in the engaged or down position. In this position, the lap bar 244 is rotated 254 toward the seat pan 234 and a passenger's lap when a passenger is seated in the seat assembly as shown in FIG. 6. In this down or engaged position, a gap or space 360 is provided between the lower edge or side 296 of the side leg shield 246 and an upper surface of the base or platform 214 in the left footwell of the vehicle 200. The size of this gap 360 may be stated as a gap height, $h_{Gap}$, that may be chosen to be at least 1 inch (to avoid a pinch point) but small enough to fully contain a passenger's feet and/or legs in the footwell such as less than about 4 inches. As shown, the lower edge 296 may be generally parallel to the base 214 in the engaged or down position of the lap bar assembly 240. Also, in the engaged position, there is a gap 362 provided between the behind-the-knee pin or peg 242 and a rear edge or side 298 of the side leg shield 246, and this gap 362 typically would have a magnitude of 1 to 4 inches (or more in some cases) to avoid a pinch point but to also constrain movement of a foot or leg of a passenger out of the footwell and contained spaced defined by the shields 246 and 247 and pin 242.

Figure 5:
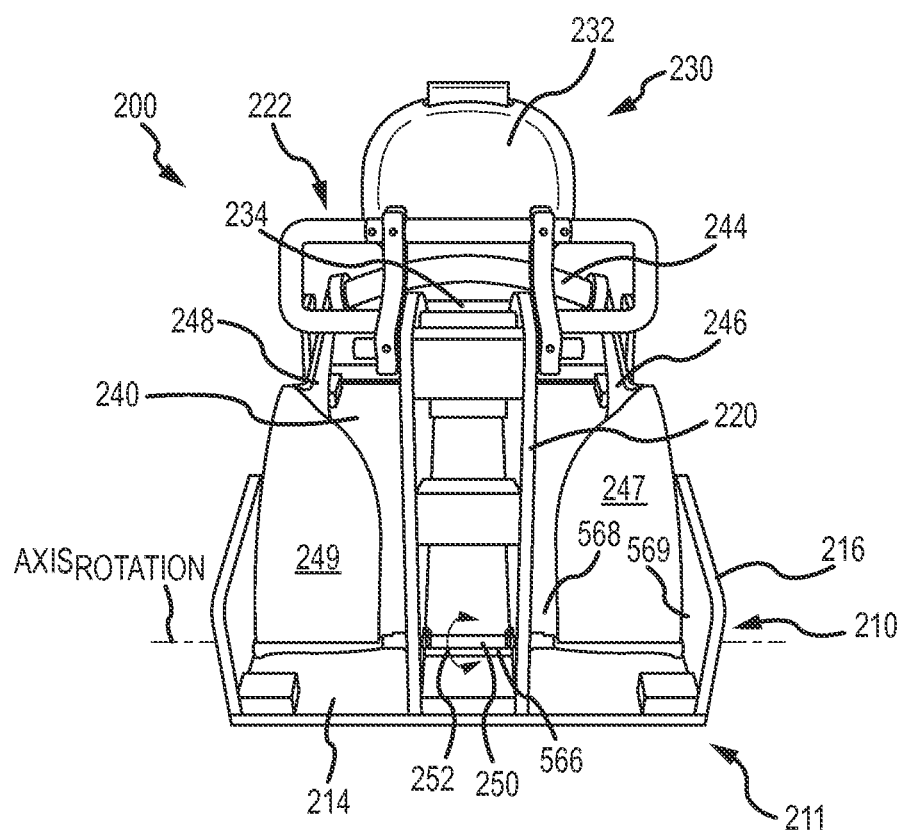
FIG. 5 is a front view of the ride vehicle of FIGS. 2-4 with the lap bar assembly shown in the engaged or down (or locked) position.

FIG. 5 illustrates a front view of the vehicle 200 with the lap bar assembly 240 in the down or engaged position. As shown, the rotation axle or shaft 250 may be supported (e.g., upon bearings or bearing surfaces and interconnected with a locking mechanism) upon the center portion 220 such that there is a gap or spacing 566 between the axle 250 and the upper surface of the base 214 of the vehicle body 210. This gap 566 may be relatively small (e.g., 1 to 3 inches or the like) to avoid providing a space for a passenger's foot to slide underneath the axle 250 and lower front or leading edge of the front leg shields 247, 249. Gaps or spaces 568, 569 are also provided between the side edges of the shields 247, 249 and the adjacent surfaces of the center portion 220 and sidewall 216 as shown for shield 247. These gaps 568, 569 are also chosen to be large enough to avoid creating a pinch point such as at least 1 inch but small enough to provide forward or longitudinal containment such as less than 3 inches or the like.

FIG. 6 illustrates a side upper perspective view of the vehicle 200 with a passenger 604 positioned in the seat assembly 230 and with the lap bar assembly 240 in the down or engaged position. In the illustrated embodiment, the passenger 604 engages the lap bar assembly 240 by grasping the lap bar 244 with their hands 606 and pulling the lap bar 244 downward from the disengaged or up position (shown in FIG. 3) into the engaged position as shown with arrow 655. This causes the axle 250 (and interconnected shields 246, 247, 248, 249) to rotate about the rotation axis, $Axis_{Rotation}$.

As shown in FIG. 6, the passenger 604 has his left leg 608 restrained longitudinally by the front leg shield 247 (in the forward direction) and by the behind-the-knee pin 242 (in the rearward or aft direction) and also restrained laterally by the side leg shield 246. In this manner, the passenger 604 can ride in the vehicle 200 safely when the vehicle 200 is used in an amusement park ride without concern of the passenger 604 being able to move their leg 608 or foot 609 into an unsafe position.

FIGS. 7-10 illustrate another embodiment of a ride vehicle 700 for use in an amusement park ride and with the passenger restraint features described herein. The ride vehicle 700 is a tandem vehicle designed for seating two passengers, and the following description discusses passenger restraint with reference to the rear passenger envelope with the understanding that similar restraint would be provided in the forward passenger envelope or space.

With reference to FIGS. 7 and 8, the vehicle 700 includes a base or platform 714 as part of its vehicle body with a center portion or pedestal 720 extending upward from an upper surface 719 of the base 714 along a center area of the vehicle 700. A seat assembly 730 is mounted upon an upper rear segment of the center body portion 720 including a seat back 732 and a seat pan 734. The center body portion 720 along with seat pan 734 and seat back 732 define an upright straddle-type seating arrangement for passengers of the vehicle 700 as the passengers step over the center portion 720 and/or seat pan 734 to position one leg on each side of the center portion 720 as they position themselves in the seat assembly 730. The vehicle 700 further includes a handle bar assembly 722 provided on an upper forward segment of the center body portion 720, and the assembly 722 may be rigidly or otherwise mounted in the vehicle 700 and be adapted to simulate a particular ride experience (e.g., a motorcycle or bike or other experience suited for upright, straddle-type seating of passengers).

A vertical (or generally vertical) sidewall 716 is provided that defines a footwell with a width, $W_{Well}$ (e.g., 8 to 14 inches) between the outer surfaces of the center body portion 720 and the inner surfaces of the sidewall 716. The footwell and sidewall 716 are shown to run the length of the center body portion 720 (e.g., along the length of the rear passenger envelope or space of the vehicle 700). A recessed section or segment 717 of the sidewall 716 defines an access or opening to the vehicle 700 and the seat assembly 730 for a passenger with a step plate 718 being provided on an upper surface of the recessed section 717. The sidewall 716 may have a first height, $h_1$, that is relatively high to enclose the footwell such as 6 to 12 inches while the sidewall height, $h_2$, at the recessed section 717 and step plate 718 may be much less to allow easy ingress/egress (avoid a trip hazard) but still retain loose shoes or other passenger articles. In some cases, the second height, $h_2$, is in the range of 2 to 6 inches with 3 inches used in some implementations. The length of the opening and step plate 718 may be large enough to make ingress/egress safe and non-awkward such as at least the length of the seat pan 734 or in the range of 18 to 36 inches.

The vehicle 700 further includes a passenger restraint system 740 that includes a behind-the-knee pin 742 along with a lap bar assembly including a lap bar 744 and interconnected side leg shields 746, 748 and front leg shields 747, 749. As shown with arrows 799, the shields 746, 747, 748, and 749 and the lap bar 744 are pivotal as a unit between a disengaged or up position (not shown but would be similar to that shown in FIG. 3 for lap bar assembly 240) and an engaged or down position. To this end, the passenger restraint system 740 further includes a pivotal member 750 such as a shaft or axle supported by the center body portion 720 and defining a rotation axis, $Axis_{Rotation}$, for the lap bar assembly (integral leg shields and lap bar).

In the down or engaged position, as shown with left side leg shield 746, a lower edge 796 is positioned proximate to the upper surface 719 of the base 714. Further, a rear or aft edge 798 is positioned proximate to the behind-the-knee pin 742, with the shield 746 extending between a front or first end 792 to a back or second end 794. In this manner, the side shield 746 acts to constrain movement of a passenger's leg (left leg in this case) to the width, $W_{Well}$, of the footwell and within the sidewall 716. The behind-the-knee pin 742 is shown in the engaged position or forward position in the groove 780 (underneath the seat pan 734 at a forward or center position in the pan 734), and, with the pin 742 spaced apart a small gap distance (e.g., 1 to 2 inches or the like), a passenger is blocked from moving their leg longitudinally rearward toward the back of the vehicle 700.

Figure 9B:
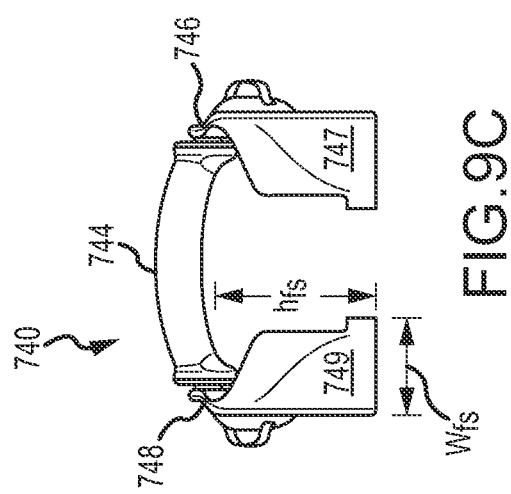
FIGS. 9A-9C are top/plan, side, and front views of the lap bar assembly of FIGS. 7 and 8 showing the integration of the front and side leg shields with the lap bar into an integral unit or member (e.g., to provide a unitary member that can be pivoted upon its rotational mount to the vehicle body between a fully disengaged position and an engaged or locked position)
Figure 9C:
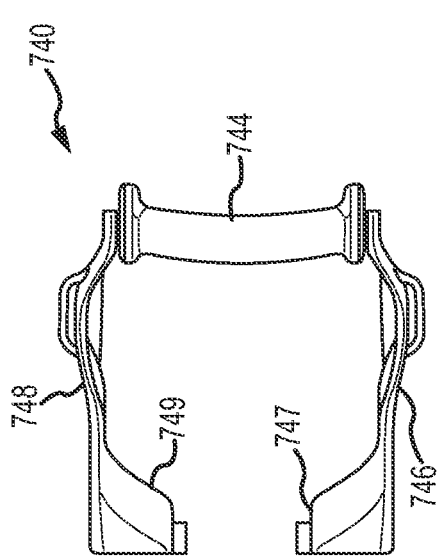
Figure 9A:
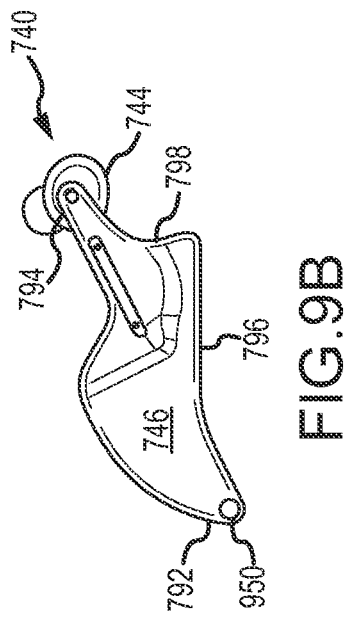

FIGS. 9A-9C illustrate, at least partially, a top or plan view, a side or elevation view, and a front end view, respectively, of the passenger restraint system 740. Specifically, these figures show that the system 740 includes a unitary or integral unit made up of a lap bar 744 attached at a first end to the left side leg shield 746 and at a second end to the right side leg shield 748. These three components define a U-shaped unit, with the lap bar 744 extending transverse or even orthogonal to shields 746, 748. At ends of the side leg shields 746, 748 opposite the lap bar 744, the system 740 includes left and right front leg shields 747, 749.

These shields 747, 749 extend transversely (or even orthogonally) out from the side leg shields 746, 748, respectively, and each may have a width, $W_{FS}$, that is some distance less than the width, $W_{Well}$, of a corresponding footwell (e.g., to leave a 1 inch or greater gap on the outer edges of the shields 747, 749 to the adjacent center portion 720 and sidewall 716). Each shield 747, 749 also has a length or height, $h_{FS}$, that is selected to provide a desired containment of a passenger's leg in the forward longitudinal direction such as in the range of 12 to 24 inches. At the end 792, a tubular-shaped passageway 950 is provided for receiving the axle 750 (or pivotal lap bar mount element), which may be press fit or otherwise rigidly attached to the lap bar assembly 740 (via the side leg shields 746, 748 as shown or the front leg shields 747, 749).

FIG. 10 illustrates a rear perspective view of the vehicle 700 showing again the passenger restraint system 740 being rotatable as shown with arrows 799 about the rotation axis, $Axis_{Rotation}$. Stated differently, the shields 746, 747, 748, and 749 along with the lap bar 744 are pivotally mounted to the vehicle body (e.g., center portion 720 or sidewalls 716) via an axle or shaft 750 (or other components if attached only to the sidewalls 716). The rotation axis, $Axis_{Rotation}$, may be positioned so as to be forward of the seat pan 734 and, in some cases, to extend through a lower portion of the vehicle body such as through the sidewall 716. FIG. 10 also shows more clearly that the behind-the-knee pin or peg 742 is configured to slide forward toward the front edge or end of the vehicle 700 from a disengaged first position further aft to an engaged or second position further fore (e.g., 6 to 12 inches) forward (such as to a position under a center location of the seat pan 734 or further forward). In this manner, the pin 742 is less of an obstruction to the seat assembly 730 during loading and unloading but acts to constrain rearward movement once slid forward toward the side leg shield 746 (and another pin would be provided on the opposite side near side leg shield 748).

A mechanical linkage (e.g., a mechanical actuator) may be used to interconnect the pin 742 with the lap bar assembly (e.g., with shaft/axle 750 or the like) such that when the lap bar 744 is rotated/pivoted was shown with arrows 799 the pin 742 slides in an opposite direction (forward when the lap bar 744 is pulled backward/downward and rearward when the lap bar is pushed up/forward to the disengaged position). In other cases, an electrical or other actuator may be used to independently operate the pin 742, i.e., provide the sliding 781 in the groove/slot 780. A trigger to actuation may be the operation of the lap bar assembly such as sliding 781 forward upon locking/engagement of the lap bar assembly and sliding 781 rearward upon unlocking/disengagement of the lap bar assembly.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

Prior restraints in amusement park ride vehicles were developed for passengers in a straddle-seating arrangement, but many of these designs placed the passenger in a prone position. These did not, therefore, use a lap bar and typically presented an excessively large longitudinal package or envelope when compared with the ride vehicles using the presently described lap bar restraint system. In other straddle-type seating restraints, articulating or rotating back restraints are used. These restraint designs generally provided poor lateral or side leg containment and required a lot of longitudinal space for each vehicle to provide room for rotating the back or rearward restraint (e.g., fewer vehicles could be provided in a train of a given length when compared with the present restraint system). Other vehicle designs with straddle-type seating use a T-shaped or style lap bar and deep footwells for leg containment, which can make ingress and egress slow and relatively unsafe or at least awkward for the passengers. The T-shaped lap bar systems also often have multiple pinch points, which may make their use less desirable especially when combined with a fixed behind-the-knee pin constraint that presents another obstruction during ingress and egress from the ride vehicle.

The lap bar restraint systems taught herein provide a number of significant advantages over prior restraint designs. The restraint systems provide positive passenger containment and restraint for an upright, straddle-type seating position that also allows for ease in ingress and egress by the passengers. The lap bar with integral shielding allows for enhanced or added leg containment when compared with traditional lap bar restraints. Hence, the lap bar restraint system is targeted for use with a more open type of vehicle with a straddle-type seat where positive passenger restraint and/or containment is achieved especially when the lap bar is coupled with behind-the-knee pins. The lap bar restraint system provides a very tight (or short) longitudinal package and passenger pitch that may be useful for solo, tandem, and other seating configurations when compared with other restraint systems, which should allow ride designers to achieve a decreased overall vehicle length.

A wide variety of materials may be used to fabricate the components of the passenger restraint system and lap bar assembly described herein such as plastics, metals, composites, and the like. The components may generally be rigid but flexible and/or resilient materials may be used in some cases or for particular components (e.g., padding may be provided on surfaces which may contact the passenger of a ride vehicle). The shields may be solid as shown in the figures or may contain relatively small openings (not large enough to pass a passenger's foot and so on) such as mesh or screen shield design. The shapes of the shields may also vary widely to implement the containment functions taught in this description with the figures providing exemplary and useful but not limiting shapes for the shields.

At this point in the description, it may be useful to describe other passenger restraint system designs that provide side or lateral leg containment in a wide variety of vehicle and seating types by use of a lap bar with an integral, articulated leg shield. The seating in such vehicles may be a single seat, could be tandem seating with a front and rear seat or with side-by-side seating, or other seating arrangements that are suited for passenger restraint using a lap bar. The lap bar may be a T-bar, U-bar, or other configuration to practice the restraint system as the concept of an articulated side leg shield may be integrated or used with any lap bar adapted for pivotal rotation from a disengaged (or up) position to an engaged (or down) position (and vice versa).

As will become clear from the following description, the side leg shield (one or two per lap bar depending upon the vehicle and its seating arrangement) fully articulates into a closed (or shielded or containment) position as the lap bar is moved along its stroke or travel path from a disengaged position to an engaged position. A "full" stroke to engage a lap bar may vary from passenger-to-passenger (e.g., based on the passenger's size), and the closed (or shielded or containment) position of the side leg shield may be any position within a predefined range of shield positions that are acceptable to provide safe lateral leg containment (e.g., a side leg shield would not have to hang vertically downward to provide lateral leg containment such that the shield may be in a closed position when it is, for example, plus or minus 45 degrees relative to vertical in some cases).

Figure 11:
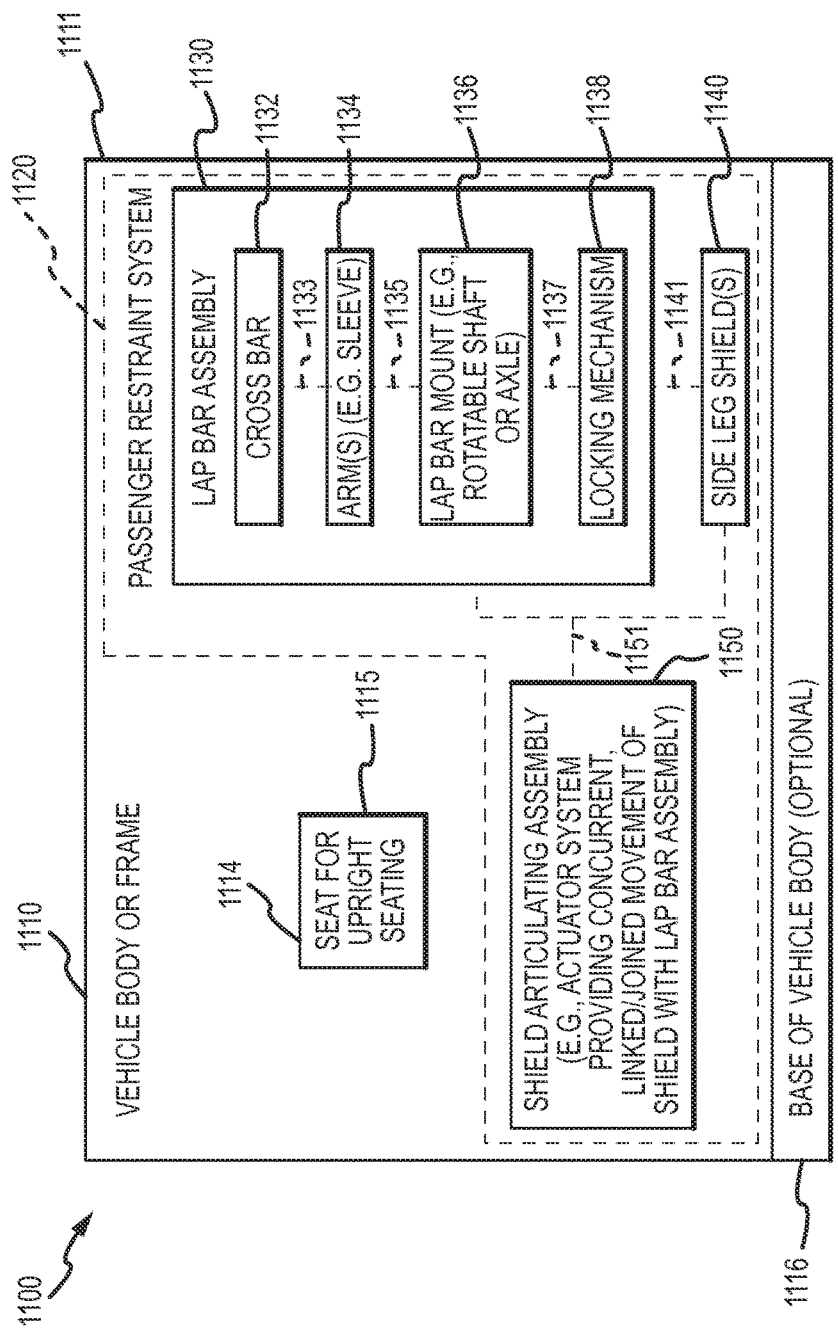
FIG. 11 is a functional block diagram of another exemplary ride vehicle for use in an amusement park ride (e.g., a train type ride with interconnected or linked sets of such vehicles) with another exemplary passenger restraint system of the present description showing use of restraint system with lap bar assembly with an integrated, articulated leg containment or shield.

FIG. 11 illustrates a functional block diagram of a ride vehicle 1100 for use in an amusement park ride such as a train-type ride in which a number of such vehicles would be linked together and travel along a ride path or on a ride track (e.g., roller coaster or similar ride). The ride vehicle 1100 includes a vehicle body or frame 1110 upon which a seat 1114 is mounted such as, but not limited to, a straddle-type seat, and the body 1110 and seat 1114 are configured to provide passengers with upright seating (e.g., not typically for use with passengers in a prone position). The front of the vehicle 1110 is shown at 1111 with a passenger using the seat 1114 facing toward the front 1111 of the vehicle 1110 and the front or leading edge 1115 of the seat 1114.

The ride vehicle 1100 includes a passenger restraint system 1120 mounted on the vehicle body or frame 1110. The passenger restraint system 1120 is designed to ensure passenger safety while also addressing goals of fast ingress/egress (loading and unloading) and safe and easy ingress/egress. The vehicle 1110 may or may not include a base/floor 1116 from which the seat 1114 may extend upward from as the vehicle may be configured to allow legs of passenger in the seat 1114 to hang or dangle freely.

More significantly, the passenger restraint system 1120 includes a lap bar assembly 1130 that is configured to provide a tight or short longitudinal envelope (e.g., short passenger pitch). To this end, the lap bar assembly 1130 is mounted toward the front 1111 of the vehicle body 1110 or forward of the seat 1114 (and a passenger on the seat 1114). The lap bar assembly 1130 includes a cross bar 1132 and one or more arms 1134 that are coupled or integral to the cross bar 1132 as shown with dashed line 1133 and that extend in a transverse direction (e.g., orthogonally) to one or more ends of the cross bar 1132. For example, the cross bar 1132 combined with the arm(s) 1134 may provide a U-shaped (or L-shaped or T-shaped or other shaped) rigid bar or pole that a passenger on the seat 1114 pulls downward toward their lap to engage the lap bar assembly 1130 at the beginning of a ride with vehicle 1100 and that releases upward and forward at the end of the ride.

To this end, the lap bar assembly 1130 includes a pivotal lap bar mount 1136 coupled as shown with dashed line 1135 with the arms 1134. For example, the mount 1136 may take the form of an axle/shaft (solid or a hollow tube) that is attached to the body or frame 1110 (or a center pedestal or portion of the body 1110) and also to ends (e.g., a collar affixed to the shaft/axle of mount 1136) of the arms 1134 (opposite the ends of the arms 1134 attached to the cross bar 1132) to be rotatable about its central, longitudinal axis. In other cases, though, other mount designs may be utilized of lap bar mount 1136 (e.g., bearing surfaces on the body 1110 that support the ends of the bar arms 1134 and allow for rotation or pivoting of the cross bar 1132 and interconnected (or integral/unitary) arms 1134). The lap bar assembly 1130 also includes a locking mechanism 1138 that acts (as shown with dashed line 1137) to engage and lock the combination of the cross bar 1132 and its arms 1134 (or the pivotal mount 1136) in the engaged position during use of the vehicle 1100 in a ride and to disengage and unlock the cross bar 1132 and arms 1134 (or the pivotal mount 1136) at the end of a ride (as is well-known in the ride industry and, therefore, not discussed in further detail herein).

The passenger restraint system 1120 further includes one or more side (or right and/or left) leg shields 1140 that are configured to protect and/or constrain legs of a passenger seated on the seat 1114. Particularly, the side leg shields 1140 may be designed and configured such that when the lap bar assembly 1130 is pivoted (e.g., on or via mount 1136) into the engaged or down position the side leg shields 1140 function to limit sideward or outward movement of a passenger's legs away from the seat 1114 and body/frame 1110. For example, the side leg shields 1140 may be configured to prevent movement of the passenger's legs beyond a predefined distance from the body/frame 1110 (or the portion of a center portion of the body that is forward and below the seat 1114), e.g., provide space for the passenger's feet, calves, and/or thighs but only allow lateral movement (i.e., movement orthogonal to the longitudinal axis of the body 1110) of a safe and preset magnitude (e.g., less than 18 inches, less than 12 inches, or some other predefined maximum amount of lateral or side leg movement).

As shown with dashed arrow 1141, the leg shields 1140 are joined or linked (such as with shield articulating assembly 1150) with the lap bar assembly 1130. Particularly, the shields 1140 may be provided in the restraint system 1120 so that movement (e.g., pivoting) of the cross bar 1132 and arms 1134 on lap bar mount 1136 articulates the side leg shields 1140 between an open (or non-shielded or non-containment) position and a closed (or shielded or containment) position (or range of such positions). Stated differently, when a passenger operates the lap bar assembly 1130 to move the cross bar 1132 into a locked or closed position at the beginning of a ride with vehicle 1100, the side leg shields 1140 are concurrently moved into a closed (or shielded or containment) position so that the passenger's leg(s) are restrained from lateral or side movement beyond some predefined limit.

To achieve shield articulation or concurrent movement, the passenger restraint system 1120 includes a shield articulating assembly (or actuator system) 1150 that is shown with dashed lines 1151 to be interconnected with both the lap bar assembly 1130 and the side leg shields 1140. The shield articulating assembly 1150 may take the form of a mechanical joining or linking of a portion of the lap bar assembly 1130 with the side leg shields 1140. In other cases, the articulating assembly 1150 may include an actuator (e.g., a pneumatic actuator, a hydraulic actuator, an electric actuator, or the like) that is configured to actuate or position the side leg shields 1140 in response to movement of the lap bar assembly 1130 (e.g., to move the shields 1140 into a closed position concurrently with movement of the cross bar 1132 and the arms 1134 into a closed/engaged position).

FIGS. 12-16 illustrate one useful implementation of a ride vehicle 1200 that makes use of the passenger restraint techniques described herein, and, particularly, includes components useful for implementing a passenger restraint system (such as system 1120 of FIG. 11) in a vehicle adapted for upright, straddle-type passenger seating. While not shown, the ride vehicle 1200 may be used in a variety of amusement park rides such as a train-type ride (e.g., a roller coaster or the like) with a plurality of the ride vehicles 1200 linked together end-to-end as the passenger restraint provided in the vehicle 1200 supports a relatively small passenger envelope and overall ride vehicle length and also supports easy, safe, and quick ingress and egress. Vehicle 1200 shows a tandem vehicle design with a pair of passenger restraint systems, and the following discussion addresses the forward system 1238 with the understanding that the rear system would be implemented in a similar manner.

Figure 12:
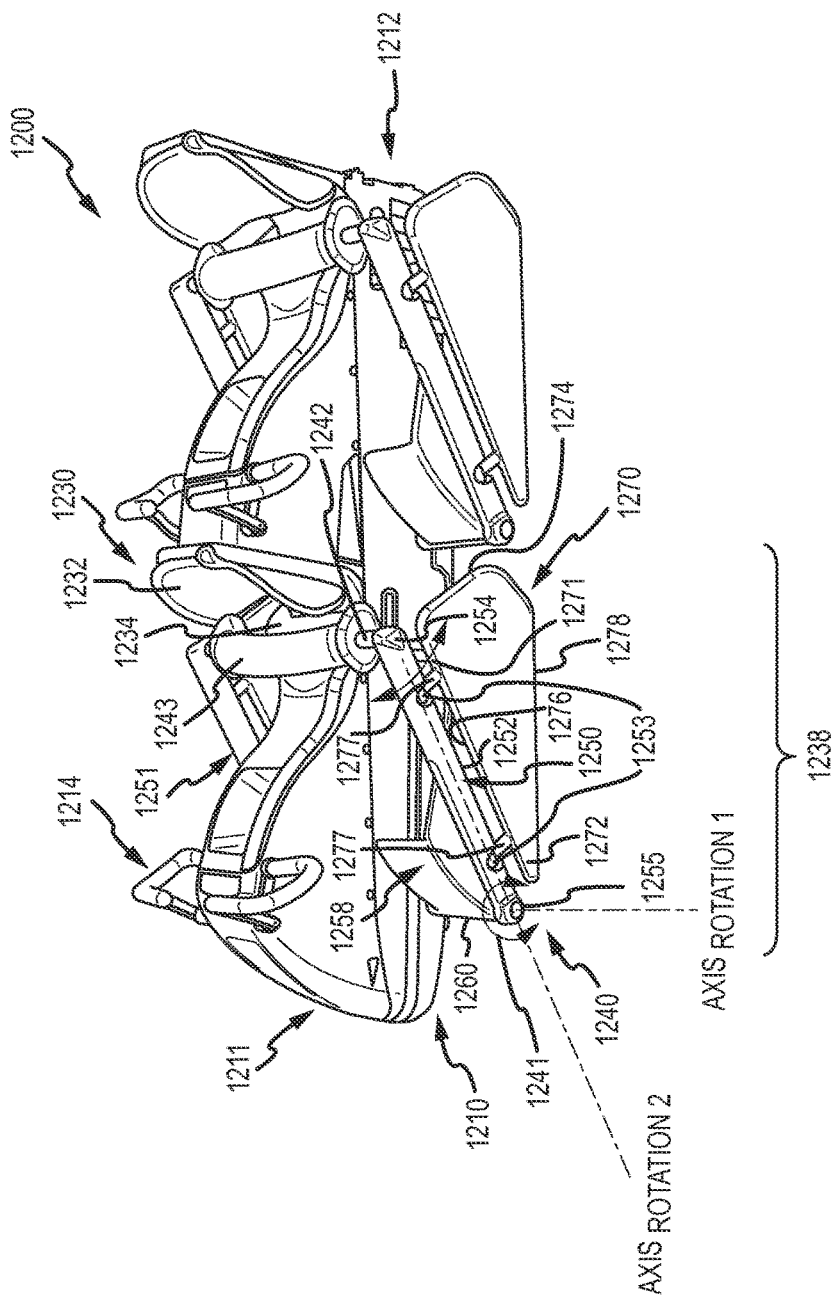
FIG. 12 is a side perspective view of a ride vehicle with a passenger restraint system of the present description (e.g., an implementation a vehicle of FIG. 11) with the passenger restraint system in the closed or engaged position.
Figure 13:
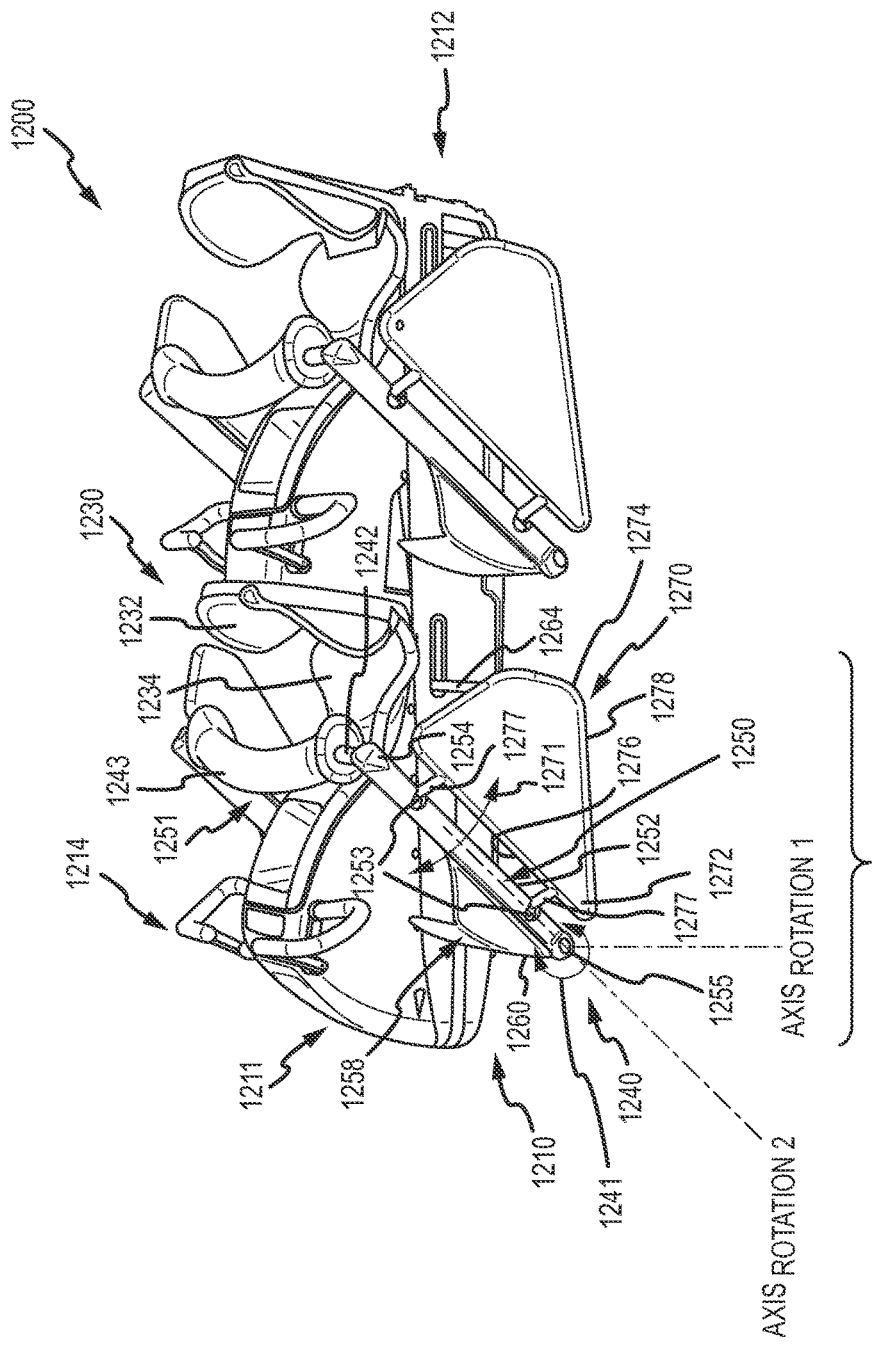
FIG. 13 is a side perspective view of the ride vehicle of FIG. 12 with the passenger restraint system moved (or moving) into a half-open (or closed) or midway position.
Figure 14:
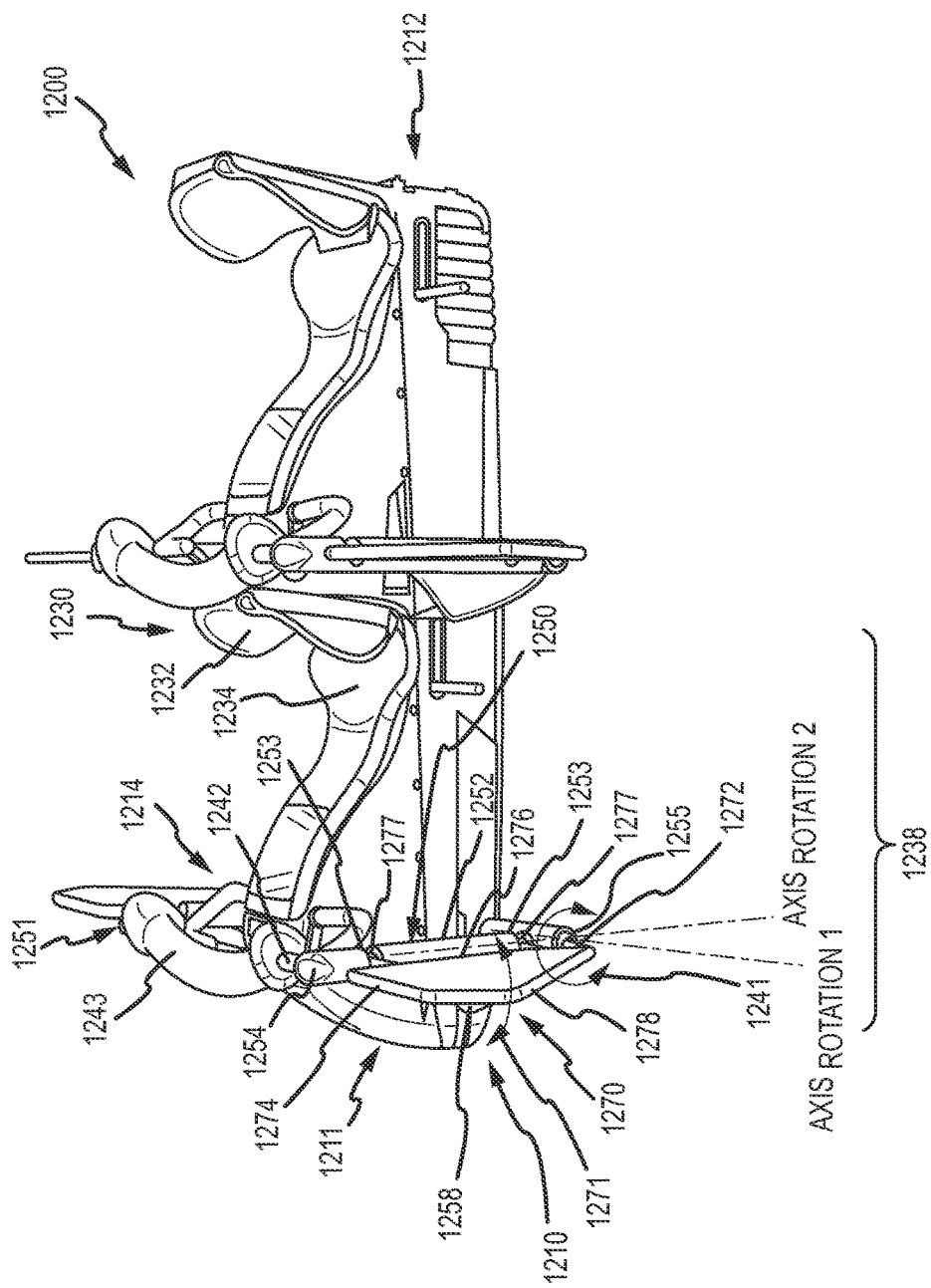
FIG. 14 is a side perspective view of the ride vehicle of FIGS. 12 and 13 with the passenger restraint system moved (or moving) into a full open or disengaged position.

Particularly, FIG. 12 is a side perspective view of a ride vehicle 1200 with a passenger restraint system 1238 of the present description (e.g., an implementation a vehicle 1100 of FIG. 11) with the passenger restraint system 1238 in the closed or engaged position (without a passenger who, during use of vehicle 1200, would be seated and restrained in the seat 1230 by the system 1238). FIG. 13 is a side perspective view of the ride vehicle 1200 of FIG. 12 with the passenger restraint system 1238 moved (or moving as shown with arrows 1241 and 1271) into a half-open (or half-closed) or midway position. FIG. 14 is a side perspective view of the ride vehicle 1200 of FIGS. 12 and 13 with the passenger restraint system 1238 moved (or moving as shown with arrows 1241 and 1271) into a full open or disengaged position. Further, FIG. 15 is a side view of the ride vehicle 1200 of FIG. 12, and FIG. 16 is a side view of the ride vehicle 1200 of FIG. 14.

As shown, the ride vehicle 1200 includes a body or frame 1210, which only includes the center portion or podium of earlier vehicle bodies, without a floor or base (e.g., the vehicle 1200 is floorless). Hence, when a passenger is in the seat 1230, their feet are free to dangle vertically downward from the body 1210. The body/frame 1210 has a front or front end 1211 and a back or rear end 1212. The body 1210 is used to support a handle bar or steering assembly 1214, e.g., handles for a passenger to grip so as to simulate a motorcycle, flying cycle, or similarly designed vehicle, at an upper and forward location (e.g., near the front end 1211 of the vehicle body 1210).

The center podium or body 1210 is also used to support a seat assembly 1230 in the form of a back support 1232 and a pan 1234. In the design shown, the seating on seat assembly 1230 is straddle-type seating as a passenger positions one leg on either side of the center portion/body 1210 when they are positioned with their buttocks in the seat pan 1234. The seating is "upright" in that the passenger has their back supported by the seat back 1232 in a vertical or nearly vertical arrangement rather than leaning forward in a prone position.

Figure 15:
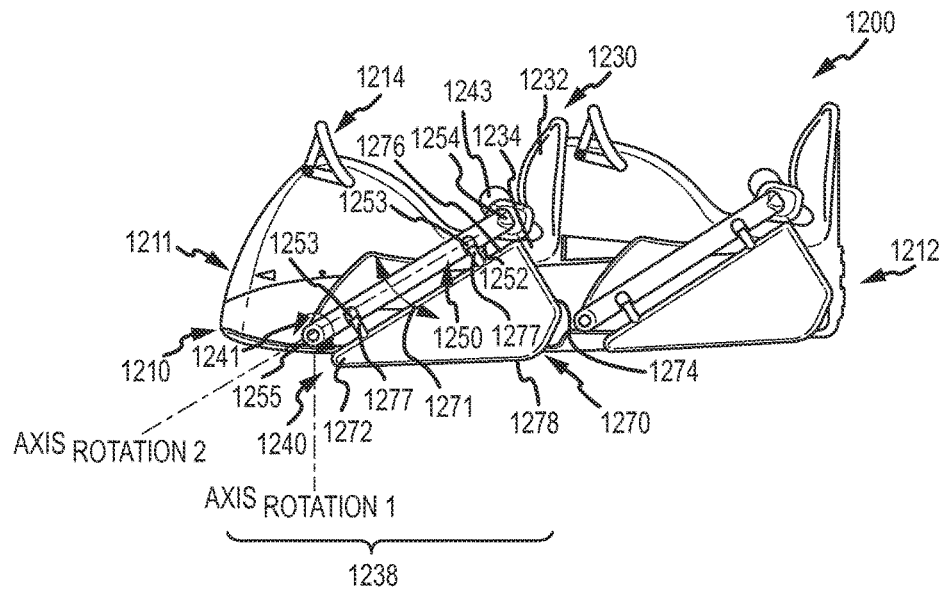
FIG. 15 is a side view of the ride vehicle of FIG. 12.
Figure 16:
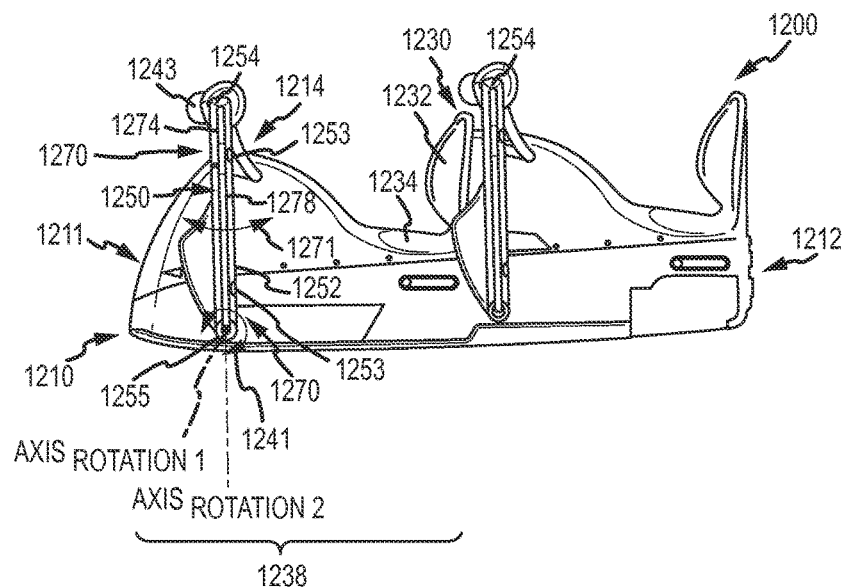
FIG. 16 is a side view of the ride vehicle of FIG. 14.

The vehicle 1200 includes the passenger restraint system or assembly 1238 to provide lateral (or sideward) containment of the legs of a passenger seated in the seat assembly 230 with the assembly 1238 in the closed or engaged position shown in FIGS. 12 and 15. As discussed for other embodiments (so a detailed description is not provided here), the restraint system 1238 may also include a front leg shield 1258 (e.g., one attached to arm 1250 at a lower or forward end 1252 to pivot with the arm 1250) to provide forward (or longitudinal) containment and a pin 1264 to provide rearward containment.

To provide lateral containment, the ride vehicle 1200 includes the passenger restraint system 1238 that is adapted to articulate or position side leg shields with movement and positioning of the lap bar. Particularly, the restraint system 1238 includes a lap bar assembly 1240 with a cross bar 1242 that has padding 1243 and that extends transverse (e.g., orthogonal) to the longitudinal axis of the vehicle body 1210 so as to extend across the seat pan 1234 in the closed position/state of the restraint system 1238. The lap bar assembly 1240 is a U-shaped lap bar and includes first and second (or left and right) arms or sleeves 1250, 1251 that extend outward (e.g., at about 90 degree angles) from opposite ends of the cross bar 1242.

With reference to the left arm 1250, the arm 1250 includes an elongated body 1252 that extends from a first or upper end 1254, which is rigidly coupled (or integrally formed) with an end of the cross bar 1242, to a second or lower end 1255. The arm body 1252 may take the form of a cylindrical tube (or other cross sectional shaped tube) so that the arm body 1252 can act as a sleeve for receiving a pivotable support element for the first or left side leg shield 1270. The support element is not shown or visible in FIG. 12 as it is wholly enclosed in the lap bar arm/sleeve 1250, but it is discussed further below as part of the discussion of the shield articulating assembly for vehicle 1200.

The lap bar assembly 1240 further includes a lap bar mount 1260 that is coupled with the second or lower end 1255 of the lap bar arm 1250 (as well as to a similar end to lap bar arm 1251). As shown, the pivotal lap bar mount 1260 may be provided with an axle or shaft that extends all or a portion of the width of the body 1210 and which may be pivotally supported (e.g., upon one or more bearings or bearing surfaces provided) by the center portion/body 1210 of the vehicle 1200. In this embodiment, the arm end 1255 would be rigidly coupled to the lap bar mount 1260 to pivot with the mount 1260. In other cases, the mount 1260 may be stationary or fixed, and the arm end 1255 may be adapted (such as in the form of a collar with inner bearing surfaces) to rotate upon the exterior mating surfaces of the mount 1260. In either case/embodiment, the rotation axis, $Axis_{Rotation1}$, for the lap bar assembly 1240 (or for the combination of the cross bar 1242 and arms 1250 and 1251) may be considered the center or longitudinal axis of the lap bar mount 1260 and pivoting about this axis is shown with arrow 1241.

When a passenger (not shown) pulls down (or pushes up upon) the cross bar 1242, the cross bar 1242 and arms 1250, 1251 rotate about the rotation axis, AxisRotation1 (or longitudinal axis of the axle/mount 1260) as shown with arrow 1241. In this way, the lap bar assembly 1240 can be moved 1241 from a disengaged or up position (as shown in FIGS. 14 and 16) to a half-open/half-closed (or midway) position (as shown in FIG. 13) and then to an engaged or down position (as shown in FIGS. 12 and 15). A locking mechanism (not shown) would typically be included in the vehicle 1200 to function to lock the lap bar assembly 1240 at least in the down/engaged position of FIGS. 12 and 15 (e.g., during ride operations) and in many cases also in the up/disengaged position of FIGS. 14 and 16 so as to facilitate safer unloading and loading of the vehicle 1200.

In contrast to conventional U-shaped lap bars, the passenger restraint system 1238 includes left and right side leg shields that are coupled with the lap bar assembly 1240 so as to be articulated by or in response to movement 1241 of the lap bar assembly 1240. Particularly, a left side leg shield 1270 is shown in vehicle 1200 to be joined with the left arm/sleeve 1250 with it being understood that a similar right side leg shield would be coupled or joined with the right arm/sleeve 1251. The left side leg shield 1270 is provided to contain a passenger's left leg proximate to the center portion/body 1210 by limiting movement of the passenger's left leg in a lateral direction outward from the left side of the body 1210 while the right side leg shield would be provided to contain a passenger's right leg in a space proximate to the center portion/body 1210 by limiting movement of the passenger's right leg in a lateral direction outward from the right side of the body 1210.

To this end, as shown for left side leg shield 1270, the shield 1270 may be a planar (or curved) member with a variety of shapes and sizes. As shown, the shield 1270 is generally triangular in shape with its "hypotenuse" or longer inner side/edge 1276 proximate to the lap bar arm 1250 but other shapes may be used. Also, the size may vary, and, in one example, the shield 1270 has a length of 2 to 4 feet as measured from forward end 1272 to rearward or aft end 1274 and a height as measured from inner side 1276 to outer side 1278 ranging from less than an inch (near the forward end 1272) up to 1 foot or more (near the rearward end 1274).

It is desirable for the shield 1270 to be articulated by or concurrently positioned with (as shown with arrow 1271) movement (as shown with arrow 1241) of the lap bar assembly 1240 in and out of the engaged or closed position (shown in FIGS. 12 and 15). To achieve this goal, the shield 1270 includes connecting pins or rods 1277 that extend through slots/guide holes 1276 in the body 1252 of the lap bar arm 1250. While not visible in these figures, a pivotal support element (e.g., an elongated rod or the like) is positioned within the sleeve/arm 1250 and is coupled with the shield 1270 via the pin/connectors 1277. The pivotal support element has a smaller outer diameter (or dimensions) than the inner diameter of the body 1252 of the arm 1250 such that the pivotal support element can rotate about its longitudinal axis, which is shown as the rotation axis, $Axis_{Rotation2}$, for the shield 1270 and extends through (or coincides with) the longitudinal axis of the lap bar arm 1250 (or body 1252).

The vehicle 1200 includes a shield articulating assembly, which is hidden from view in FIGS. 12-16 but explained in more detail below starting with FIG. 17. The pivotal support element and connecting pins 1277 may be considered part of the shield articulating assembly or of the shield 1270. The shield articulating assembly is adapted to join or link the shield 1270 via the pivotal support element with the lap bar assembly 1240 such that the shield 1270 is articulated 1271 with rotation or movement 1241 of the lap bar assembly 1240.

With reference to FIG. 15, it can be seen that the shield 1270 has been moved or articulated 1271 (with movement 1241 of the lap bar assembly 1240) into the closed or engaged position or state. The shield 1270 in this position/state may be parallel to vertical (e.g., hand straight down from the arm 1250) or in a range of "closed" positions such as plus or minus 45 degrees from vertical, such as vertical to 30 degrees (outward from the body 1210), or other useful range of closed positions. Then, with reference to FIG. 16, it can be seen that the shield 1270 has been articulated or moved 1271 (concurrently with the movement 1241 of the lap bar assembly 1240) into the open or disengaged position or state. In this example, the shield 1270 is rotated outward away from body 1210 to an open angle in a range of open angles such as plus or minus 45 degrees relative to a plane that is orthogonal to the longitudinal axis of the vehicle body 1210, plus or minus 30 degrees relative to this plane, or other useful range for allowing a passenger to readily access and exit the vehicle 1200 and seat assembly 1230 (with the shield 1270 shown in FIGS. 14 and 16 to be at about 0 degrees relative to this orthogonal, vertical plane (or to be in a vertical plane that is orthogonal to the longitudinal axis of the body 1210)). The leg shielding 1270 in the open position allows for complete threshold clearance for straddle-type seating (shown in FIGS. 12-16) as well as for traditional bucket seat designs.

FIG. 17 is a detailed view of a portion of the vehicle 1200 of FIGS. 12-16 with several components shown as hidden (or with dashed lines) so as to illustrate components of a shield articulating assembly 1750 providing mechanical linking/joining of the shield 1270 with the lap bar assembly 1240. Particularly, the lap bar arm/sleeve 1250 is shown with its body 1252 shown in dashed lines to expose a pivotal support element/rod 1758. Likewise, a connector or union 1761 rigidly coupling the lap bar arm 1250 with the lap bar mount 1260 is shown in dashed lines to review fixed gear 1752 and rotatable or non-fixed gear 1756. In operations, movement or rotation 1241 of the lap bar assembly including arm 1250 about the rotation axis, $Axis_{Rotation1}$, causes the lap bar mount 1260 (or outer shell/sleeve) to also rotate about its longitudinal axis (which coincides with rotation axis, $Axis_{Rotation1}$, in this case).

It is desirable for the shield 1270 to be linked or joined with the lap bar assembly so as to articulate with movement of the lap bar assembly. To this end, a shield articulating assembly 1750 is provided in the vehicle 1200, and the articulating assembly 1750 includes a first stationary or fixed gear 1752 mounted or positioned within lap bar mount (or sleeve) 1260. The gear 1752 can be held stationary in a number of ways while the mount/sleeve 1260 rotates in a variety of ways such as through the use of a support rod 1754 extending within a cavity of the lap bar mount/sleeve 1260 and affixed to the body 1210 of the vehicle 1200. Hence, with rotation 1241 of the lap bar mount 1260 in response to pushing or pulling of a passenger on the cross bar (which causes arm 1250 to pivot about axis, $Axis_{Rotation1}$), the support rod 1754 and gear 1752 remain stationary or fixed in place.

The shield articulating assembly 1750 also includes a second pivotal or non-stationary gear 1756 attached to an end of the pivotal support element 1758 (which in turn is affixed to the shield 1270 via pins 1277). The gear 1756 and support element 1758 are free to move as they are pivotally supported within the housing/union 1761 and the body 1252 of the arm/sleeve 1250 of the lap bar assembly 1240. The gears 1752, 1756 are mated together as shown with their teeth meshing together such that the gear 1756 travels in a planetary manner about the fixed or stationary gear 1752 when the arm 1250 and contained pivotal support element 1758 are pivoted 1241 about the lap bar rotation axis, $Axis_{Rotation1}$.

In effect, this acts to drive the gear 1756 and rigidly coupled/joined support element 1758 to pivot 1271 about the shield rotation axis, $Axis_{Rotation2}$, which extends through the support element 1758 (coincides with longitudinal axis of rod 1758 and arm/sleeve body 1252). The pivoting 1271 of the shield support element 1758 in the sleeve/arm 1250 causes the rigidly interconnected (via pins 1277) shield 1270 to also be pivoted or articulated, e.g., articulation in direct response to cross bar and arm 1250 movement by a passenger.

The gears 1752, 1756 are selected (size, number of teeth, and so on) so as to obtain a desired amount of pivoting or travel 1271 in response to an amount of pivoting or travel 1241 of the lap bar arm/sleeve 1250. In one embodiment, the gears 1752 and 1756 are chosen such that there is a one-to-two relationship between the pivoting 1241 and the pivoting 1271. For example, the lap bar assembly and its arm 1250 may have a stroke or amount of travel of about 45 degrees which articulates or pivots 1271 the support element 1758 and shield 1270 through a stroke or amount of travel of about 90 degrees. In other embodiments, a one-to-one or other useful amount of articulation may be achieved with the gear selection for the shield articulating assembly 1750. It will be understood from the discussion of the assembly 1750 and FIG. 17 that the support element 1758 and rigidly interconnected shield 1270 pivot 1241 with the sleeve/arm 1250 about the first rotation axis or lap bar rotation axis, $Axis_{Rotation1}$, and this causes the shield 1270 to be concurrently articulated. In this way, the vehicle of FIGS. 12-17 may be thought of as having a lap bar with an integral, articulated shield for providing lateral or side leg containment.

FIGS. 18A-18C are schematic side views of a portion of a passenger restraint system 1850A-1850C of the present description showing a mechanical linkage approach for implementing a shield articulating assembly. The system 1850A is in a first state or operation condition with the lap bar 1820 and articulated shield 1860 in the load/unload or open (or disengaged) position. The system 1850B is in a second state or operation condition with the lap bar 1820 and articulated shield 1860 in a partially open (or closed) position. The system 1850C is in a third state or operation condition with the lap bar 1820 and articulated shield 1860 in the ride or closed (engaged) position. From these figures, it can be seen that the leg shield 1860 (here shown as a rectangular, planar member) is articulated or pivoted 1865 solely as a function of movement/pivoting 1821 of the lap bar 1820.

In this embodiment, the assembly 1850A-1850C includes a lap bar mount 1815 that is coupled with a portion of the frame/body 1810 of the vehicle, and the lap bar mount 1815 may include a pivotal body in the form of a sleeve or tube that is fit over and free to pivot on a fixed support shaft attached to the vehicle portion 1810. Particularly, the external sleeve of the mount 1815 is pivotal about the rotation axis, AxisRotation1, which is the lap bar rotation axis. The assembly 1850A-1850C includes the lap bar 1820, which may take the form of a U-shaped bar with only one side arm/member of the lap bar 1820 shown in these figures. The lap bar 1820 is rigidly coupled at an end to the outer sleeve of the lap bar mount 1815 to pivot 1821 on the support rod of the mount 1815 such as when manipulated by a passenger of a vehicle in which the assembly 1850A-1850C is installed.

In the assembly 1850A-1850C, the side leg shield 1860 is pivotally supported by the lap bar (or arm of the lap bar) 1820 to be pivoted or articulated 1865 about the shield axis of rotation, AxisRotation2, that coincides with the longitudinal axis of the lap bar 1820. To this end, a support sleeve or tube member 1864 is rigidly attached to an inner edge or side of the shield 1860, and the support sleeve 1864 is slid over the end of the lap bar 1820. The support sleeve or tube member 1864 is free to pivot on an exterior surface of the lap bar 1820 and is not joined to the lap bar mount 1815.

A shield articulating assembly 1870 is provided in the assembly 1850A-1850C to move the shield 1860 in response to or in conjunction to movement/pivoting 1821 of the lap bar 1820. The shield articulating assembly 1870 includes a connecting rod 1872 that is rigidly attached at one end to the body 1810, and the assembly 1870 includes a pair of ball joints 1876 with one on the exposed/exterior end of the connecting rod 1872 and with the other one affixed to an inner edge/side of the shield 1860 (e.g., proximate to the lap bar mount 1815 but spaced apart a distance from the shield support sleeve 1864). The two ball joints 1876 are joined/linked together with a connecting link arm 1874, and the articulating assembly 1870 may be thought of as implementing articulation using a dual heim end link that causes the shield 1860 to pivot/articulate 1865 solely as a function of movement/pivoting 1821 of the lap bar 1820.

FIG. 19 is a front perspective view of another vehicle 1900 with a differing design, i.e., with side-by-side bucket (non-straddle-type) seating, that incorporates a passenger restraint system 1920 of the present description. FIG. 20 is a side view of the vehicle of FIG. 19, with a stroke or travel path for the lap bar assembly 1940 shown (e.g., about 40 to 50 degrees while the integral, articulated shield concurrently travels 80 to 100 degrees between its open and closed (disengaged and engaged) positions).

The vehicle 1900 includes a body/frame 1910 with a front or forward portion 1911 and a back or rear portion 1912. Further, the body 1910 in this embodiment includes a floor or chassis 1914 that supports a passenger's feet (no free dangling in this embodiment) and also can be used for a physical support or mounting location for components of the passenger restraint system 1920 such as the lap bar mount 1960 at a location near the front 1911 of the body 1910 (or forward of the seat assemblies 1930).

In the vehicle 1900, a pair of seat assemblies 1930 are provided with a seat back 1932 and a seat pan 1934 arranged in a side-by-side manner. This provides upright bucket-type seating for passengers at a location near the back portion 1912 of the vehicle body 1910 and facing toward the front portion 1911, and, when seated on seat pan 1934, the passenger's feet would be supported on an upper surface of the flooring or base 1914. The ride vehicle seating configuration allows leg containment where a leg shield (e.g., shield 1970) is only integrated into the outer portion of the lap bar 1940 (e.g., for U-shaped or L-shaped lap bar systems with FIGS. 19 and 20 showing a U-shaped lap bar 1940).

Particularly, as shown, the vehicle 1900 includes a passenger restraint system 1920 supported upon the body 1910 (such as near the front portion 1911). The passenger restraint system 1920 includes a lap bar assembly (or, simply, lap bar) 1940 with a U-shaped design, and the lap bar 1940 is pivotally mounted to the floor/base 1914 via a lap bar mount 1960. During operation, the lap bar 1940 can be pivoted as shown with arrow 1941 about a rotation or pivot axis, $Axis_{Rotation1}$, coinciding with a longitudinal axis of the lap bar mount 1960 in this example (or extending through ends of the lap bar 1940 orthogonal to a longitudinal axis of the body 1910 in this and other typical embodiments).

The lap bar assembly 1940 includes a cross bar 1942 (which is covered with a padding element 1943) from which an inner arm and an outer arm 1950 extend toward the floor 1914 and pivotal connection with the mounting element 1960. The outer arm 1950 is configured to contain a pivotal support element or rod (not shown) for the shield 1970 (as discussed with regard to FIG. 17), and, to this end, the arm 1950 has a body 1952 that may be a hollow tube or sleeve.

A first or rearward end 1954 of the body 1952 is rigidly connected to an end of the cross bar 1942 while a second or forward end 1955 of the body 1952 is coupled to the lap bar mount 1960 so that when a passenger in seat 1930 pushes or pulls on the lap bar 1940 it pivots 1941 about the pivot/rotation axis, $Axis_{Rotation1}$. In the figures, the lap bar 1940 is shown in the closed or engaged position, and FIG. 20 shows a stroke or travel path 1949 (a travel of 40 to 50 degrees is shown) for the lap bar from an open or disengaged position to the shown closed or engaged position with the padded cross bar 1942 near or contacting a lap of the passenger 1905 in seat 1930.

As shown, the passenger restraint system 1920 includes a side leg shield 1970, and the outer arm 1950 includes one or more spaced-apart opening or slots 1958 to allow connecting pins/rods 1979 to connect the shield 1970 with the, not visible in FIGS. 19 and 20, pivotal support element/rod. The shield 1970 includes an outer (or lower) edge/side 1976 and an inner (or upper) edge/side 1978, and the connecting pins/rods 1979 extend out from the inner edge/side 1978 of the shield 1970 through the arm openings/slots 1958. In this way, the shield 1970 is pivotally supported by the outer arm 1950 of the lap bar 1940 (e.g., the shield 1970 is integral with the lap bar 1940).

Articulation of the shield 1970 with movement of the lap bar 1940 through stroke 1949 is achieved through the use of a shield articulating assembly provided on vehicle 1900 (e.g., an actuator or a mechanical joining/interconnection as discussed below with reference to FIGS. 21A and 21B). Briefly, though, the shield 1970 is moved or articulated by (or in response to) movement 1941 of the lap bar 1940 such that when the lap bar 1940 moves through the stroke 1949 from an open position to the shown closed position the shield 1970 concurrently moves from its open position to the shown closed/engaged position. In other words, the pivotal support element in arm 1950 is caused to rotate/pivot about the rotation/pivot axis, $Axis_{Rotation2}$, which, in turn, causes the shield 1970 (which is coupled to the pivotal support element via the pins/rods 1979) to also be pivoted or articulated.

As shown, the shield 1970 is generally triangular in shape. It includes a front edge/side 1972 near the forward end 1955 of the lap bar arm 1950 and a back edge/side 1974 near the seat 1930 and back portion 1912 of the vehicle body 1910. Side leg containment is achieved by matching the shape and size of the shield 1970 with the design of the seat 1930 and body 1910. In this example, the inner edge 1978 of the shield is spaced apart a small (e.g., 2 inches or less) distance from the nearby surfaces of the outer arm body 1952 so as to allow the shield 1970 to freely move relative to the arm 1950 while not providing too big a gap (e.g., to prevent a passenger 1905 from pushing their feet outside the envelope of the vehicle 1900). Further, front edge 1972 is spaced apart a small distance from the floor 1914 and the lap bar mount 1972 (e.g., about 2 inches to avoid a pinch point), and the rear edge 1972 is positioned nearby but a small distance or gap (again to avoid a pinch point for a passenger but to provide adequate lateral containment and capture of loose personal items such as footwear) from the rear portion 1912 of the body 1910. The lower edge 1976 may be spaced apart from the body base 1914 (such as 2 inches to avoid a pinch point), but it may overlap some distance with the top surface of the base/chassis 1914 of the vehicle body 1910 to achieve better lateral containment of the leg of the passenger 1905 as shown (or to achieve a desired vehicle appearance).

FIGS. 21A and 21B illustrate the vehicle 1900 of FIGS. 19 and 20 implementing two different shield articulating assembly designs. As discussed with reference to FIG. 17, the shield articulating assembly may be implemented using internal geared linkage, and the passenger restraint system 1920 of FIG. 21A implements such an internal geared linkage. This linkage may take the form of the assembly 1750 of FIG. 17 or another useful configuration for causing a pivotal support element attached to the shield 1750 and housed/contained in (or on) the outer arm 1950 to rotate about its longitudinal axis with movement of the supporting outer arm body (or sleeve) 1952.

FIG. 21A shows the lap bar 1940 and integrated/articulated shield 1970 in both the open/disengaged position and the closed/engaged position. In the open position, the shield 1970 has been rotated or pivoted 1971 about the pivot axis, $Axis_{Rotation2}$, so that it extends outward from the body 1910 to provide an ingress/egress opening or window 2105 (e.g., a 2 to 3 foot gap between the padded cross bar 1942 and the front edge of the seat pan 1934). In this position, the shield 1970, which is shown as planar but may be curved in some cases, is orthogonal to a longitudinal axis of the body 1910. In other cases, though, the shield 1970 may pivot 1971 less (or more) than the 90 degrees shown such as 75 to 90 degrees (or 90 to 105 degrees or more). The shield 1970, in the closed position, is shown to be substantially vertical but this is not required to provide proper containment, e.g., the shield 1970 may be "closed" when at an angle relative to vertical in the range of plus or minus 30 degrees depending on the design of the vehicle body 1910 and/or the seat 1930.

As discussed with reference to FIGS. 18A-18C, a shield articulating assembly may be implemented as shown with assembly 1850A-1850C using connecting rod linkage. With this in mind, FIG. 21B shows the vehicle 1200 with the passenger restraint system 1920 implementing a passenger restraint system 1920 using a shield articulating assembly 2180 (e.g., in the form shown in assembly 1850A-1850C). The assembly 2180 is shown to include a connecting rod linkage 2184 (e.g., a pair of ball joints and a connecting link arm) and a pair of connectors/connection linkage 2182 that attach the linkage 2184 to the body 1910 (e.g., to the base/flooring 1914) and also interconnect the shield 1970 (at forward end 1972) to the fixed vehicle frame/body 1910 (e.g. to the base/flooring 1914).

I claim:

1. A vehicle for use in an amusement park ride with upright passenger seating, comprising:

a vehicle body;

a seat pan provided in the vehicle body between a front end and a rear end of the vehicle body;

a lap bar assembly;

a lap bar mount pivotally supporting the lap bar assembly within the vehicle body wherein the lap bar pivots about a lap bar rotation axis passing between the seat pan and the front end of the vehicle body;

a side leg shield; and a shield articulating assembly concurrently pivoting the side leg shield about a shield rotation axis from an open to a closed position with a pivoting of the lap bar assembly about the lap bar rotation axis from a disengaged to an engaged position, wherein the lap bar assembly includes a cross bar and a lap bar arm extending from a first end that is coupled to the cross bar to a second end, opposite the first end, that is coupled to the lap bar mount, wherein the side leg shield extends outward from and is pivotally supported by the lap bar arm, and wherein the shield rotation axis extends through the lap bar arm and is transverse to the cross bar.

2. The vehicle of claim 1, wherein the shield articulating assembly comprises a mechanical linkage or an actuator providing the pivoting of the side leg shield with the pivoting of the lap bar assembly.

3. The vehicle of claim 2, wherein the mechanical linkage comprises a stationary gear mounted on or in the lap bar mount and a nonstationary gear mated with the stationary gear and rigidly coupled with the side leg shield, whereby the side leg shield pivots about the shield rotation axis with movement of the nonstationary gear.

4. The vehicle of claim 3, wherein the passenger restraint system includes a shield support element rigidly coupled with the side leg shield, wherein the lap bar arm has a tubular body, wherein the shield support element is positioned within the tubular body, and wherein the nonstationary gear is affixed to the shield support element, whereby the shield support element pivots within the tubular body of the lap bar arm when the nonstationary gear moves relative to the stationary gear.

5. The vehicle of claim 2, wherein the mechanical linkage comprises a connecting rod linkage coupling the side leg shield with a rigid frame element of the vehicle body.

6. The vehicle of claim 1, wherein the vehicle body comprises a center pedestal portion extending a longitudinal axis of the vehicle body, wherein a passenger seated on the seat pan straddles the center pedestal portion with a left leg on a left side of the center pedestal portion and a right leg on a right side of the center pedestal portion, and wherein the vehicle body is floorless such that feet of the seated passenger are not supported by a floor in the vehicle body.

7. The vehicle of claim 1, wherein the lap bar assembly is pivoted through a first magnitude of angular rotation and the side leg shield is pivoted through a second magnitude of angular rotation that is greater than the first magnitude of angular rotation.

8. A vehicle for use in an amusement park ride with upright passenger seating, comprising:
a vehicle body;
a seat pan provided in the vehicle body between a front end and a rear end of the vehicle body;
a lap bar assembly;
a lap bar mount pivotally supporting the lap bar assembly within the vehicle body, wherein the lap bar pivots about a lap bar rotation axis passing between the seat pan and the front end of the vehicle body;
a side leg shield; and
a shield articulating assembly concurrently pivoting the side leg shield about a shield rotation axis from an open to a closed position with a pivoting of the lap bar assembly about the lap bar rotation axis from a disengaged to an engaged position,
wherein the lap bar rotation axis is in a first plane and wherein the shield rotation axis is in a second plane that is orthogonal to the first plane.

9. A vehicle for use in an amusement park ride with upright, straddle-type passenger seating, comprising:
a vehicle body;
a seat pan mounted on the vehicle body between a front end and a rear end of the vehicle body;
a lap bar assembly;
a lap bar mount pivotally supporting the lap bar assembly within the vehicle body to pivot about a lap bar rotation axis passing through the vehicle body;
a side leg shield;
a shield articulating assembly concurrently pivoting the side leg shield about a shield rotation axis from a first position to a second position with a pivoting of the lap bar assembly about the lap bar rotation axis from a first position to a second position; and
a support element rigidly coupled to the side leg shield and pivotally supported by the lap bar assembly to rotate about the lap bar rotation axis with the pivoting of the lap bar assembly,
wherein the shield rotation axis extends through support element, and
wherein the shield rotation axis is transverse to a plane containing the lap bar rotation axis.

10. The vehicle of claim 9, wherein the shield articulating assembly comprises a geared linkage.

11. The vehicle of claim 10, wherein the geared linkage comprises a stationary gear supported on the vehicle body, wherein the lap bar rotation axis coincides with a center axis of the fixed gear, and wherein the geared linkage further comprises a nonstationary gear mating with the stationary gear and coupled directly or indirectly to the side leg shield, whereby the side leg shield pivots about the shield rotation axis with rotation of the nonstationary gear.

12. The vehicle of claim 9, wherein the shield articulating assembly comprises connecting rod linkage with a first joint coupled to the vehicle body, a second joint coupled to the side leg shield, and a link arm extending between and connecting the first and second joints.

13. The vehicle of claim 12, further including an elongated support member coupled to the side leg shield and pivotally supported by an arm of the lap bar assembly to be pivotal about the shield rotation axis when concurrently rotated about the lap bar rotation axis with the lap bar assembly.

14. A vehicle for use in an amusement park ride with upright passenger seating, comprising:
a vehicle body;
a seat assembly including a seat pan provided in the vehicle body between a front end and a rear end of the vehicle body, wherein the vehicle body comprises a center pedestal portion extending a longitudinal axis of the vehicle body, wherein a passenger seated on the seat pan straddles the center pedestal portion with a left leg on a left side of the center pedestal portion and a right leg on a right side of the center pedestal portion, and wherein the vehicle body is floorless such that feet of the seated passenger are not supported by a floor in the vehicle body; and
a passenger restraint system comprising:
a lap bar comprising a cross bar and an arm extending out from an end of the cross bar,
a leg shield pivotally coupled with and pivotally supported by the arm of the lap bar, and
a shield articulating assembly mechanically joining the lap bar and the leg shield, wherein the leg shield is articulated from a closed position to an open position by movement of the lap bar from a first position to a second position,
wherein the leg shield includes a body and an elongated support member rigidly coupled with the body and supported for pivoting within the arm or rotating upon an external surface of the arm and
wherein the leg shield is articulated by pivoting about a rotation axis coinciding with a longitudinal axis of the elongated support member.

15. The system of claim 14, wherein the shield articulating assembly includes a gear affixed to an end of the elongated support member distal to the cross bar.

16. The system of claim 14, wherein the shield articulating assembly comprises a first ball joint coupled to the body of the leg shield, a second ball joint for connection to a fixed portion of a body of the ride vehicle, and a link arm connecting the first and second ball joints.

* * * * *